US012013661B2

(12) United States Patent
Tanabe et al.

(10) Patent No.: US 12,013,661 B2
(45) Date of Patent: Jun. 18, 2024

(54) METHOD FOR PRODUCING CARRIER FOR ELECTROSTATIC CHARGE IMAGE DEVELOPMENT, METHOD FOR PRODUCING ELECTROSTATIC CHARGE IMAGE DEVELOPER, IMAGE FORMING METHOD, AND CARRIER FOR ELECTROSTATIC CHARGE IMAGE DEVELOPMENT

(71) Applicant: FUJIFILM Business Innovation Corp., Tokyo (JP)

(72) Inventors: Takeshi Tanabe, Kanagawa (JP); Shintaro Anno, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 252 days.

(21) Appl. No.: 17/459,277

(22) Filed: Aug. 27, 2021

(65) Prior Publication Data

US 2022/0308489 A1 Sep. 29, 2022

(30) Foreign Application Priority Data

Mar. 23, 2021 (JP) ................................ 2021-049118

(51) Int. Cl.

*G03G 9/107* (2006.01)
*G03G 9/087* (2006.01)
*G03G 9/113* (2006.01)

(52) U.S. Cl.

CPC ....... *G03G 9/1075* (2013.01); *G03G 9/08702* (2013.01); *G03G 9/1131* (2013.01); *G03G 9/1136* (2013.01)

(58) Field of Classification Search

CPC ............. G03G 9/1075; G03G 9/08702; G03G 9/1131; G03G 9/1136

See application file for complete search history.

(56) References Cited

U.S. PATENT DOCUMENTS 5,952,143 A 9/1999 Ootaki et al.
2009/0109448 A1* 4/2009 Kiyono ................ G03G 9/1133 430/108.9

FOREIGN PATENT DOCUMENTS

JP 05-100497 A 4/1993
JP 06-59519 A 3/1994

(Continued)

OTHER PUBLICATIONS

English machine translation of the description of JP-2008145920-A (Year: 2008).*

(Continued)

*Primary Examiner* — Peter L Vajda
*Assistant Examiner* — Boone Alexander Evans
(74) *Attorney, Agent, or Firm* — Sughrue Mion, PLLC

(57) ABSTRACT

A method for producing a carrier for electrostatic charge image development includes coating magnetic particles by adding the magnetic particles and a coating liquid containing a resin and a solvent to a mixer with a stirring blade to form a resin coating layer on surfaces of the magnetic particles and taking a carrier having the resin coating layer out of the mixer. In the coating, the stirring conditions after the solvent is evaporated and dried by heating in the mixer until the carrier is taken out of the mixer satisfy Formula 1 below and Formula 2 below:

$$0.2 \leq \text{peripheral speed } \pi Dn \text{ (m/s) of stirring blade} \leq 2.0 \quad \text{Formula 1,}$$

$$1\times 10^3 \leq \text{stirring workload (peripheral speed} \times \text{stirring time T)} \leq 4\times 10^3 \quad \text{Formula 2,}$$

where D represents a diameter (m) of the stirring blade, n represents a number of revolutions (rps) of the stirring blade, and T represents a time (s) from a time point at which, after a load power of the stirring blade before drying of the solvent increases with drying until (Continued)

completion of drying, a load power of the stirring blade decreases to 1.3 times or less the load power of the stirring blade before drying to a time point at which stirring in the mixer is stopped.

14 Claims, 3 Drawing Sheets

(56) References Cited

FOREIGN PATENT DOCUMENTS

| | | | | | |
|---|---|---|---|---|---|
| JP | H06059519 | A | * | 4/1994 | |
| JP | 08-234499 | A | | 9/1996 | |
| JP | 10-97104 | A | | 4/1998 | |
| JP | 2007-256858 | A | | 10/2007 | |
| JP | 2008145920 | A | * | 6/2008 | |
| JP | 2020015893 | A | * | 1/2020 | ........ B01F 15/00246 |

OTHER PUBLICATIONS

English machine translation of the description of JP-2020015893-A (Year: 2020).*

* cited by examiner

METHOD FOR PRODUCING CARRIER FOR ELECTROSTATIC CHARGE IMAGE DEVELOPMENT, METHOD FOR PRODUCING ELECTROSTATIC CHARGE IMAGE DEVELOPER, IMAGE FORMING METHOD, AND CARRIER FOR ELECTROSTATIC CHARGE IMAGE DEVELOPMENT

CROSS-REFERENCE TO RELATED APPLICATIONS

This application is based on and claims priority under 35 USC 119 from Japanese Patent Application No. 2021-049118 filed Mar. 23, 2021.

BACKGROUND

(i) Technical Field

The present disclosure relates to a method for producing a carrier for electrostatic charge image development, a method for producing an electrostatic charge image developer, an image forming method, and a carrier for electrostatic charge image development.

(ii) Related Art

Japanese Unexamined Patent Application Publication No. 10-097104 discloses an electrophotographic carrier having, on the entire surfaces of the carrier particles, a resin coating layer containing a thermosetting resin as a main component, wherein a protrusion area-resin coating is thinly formed, and the protrusion area-resin coating occupies 55% to 90% of the entire area of the carrier.

Japanese Unexamined Patent Application Publication No. 2007-256858 discloses an electrophotographic carrier produced by coating a core made of magnetic material with resin, wherein the concentration of free resin powder particles in the carrier is $5\times10^3$ particles/ml or less.

Japanese Unexamined Patent Application Publication No. 8-234499 discloses a method for producing an electrophotographic carrier including a carrier core and a resin that coats the surface of the carrier core, wherein the carrier is homogenized by using an air classifier.

Japanese Unexamined Patent Application Publication No. 6-059519 discloses a method for producing an electrophotographic developer carrier including, after a step of coating a developer carrier with resin, curing the resin, and loosening the developer carrier, subjecting the resulting developer carrier to a free resin removal treatment to remove free resin from the surface of the developer carrier.

SUMMARY

Aspects of non-limiting embodiments of the present disclosure relate to a method for producing a carrier for electrostatic charge image development, wherein the method includes a coating step of adding magnetic particles and a coating liquid containing a resin and a solvent to a mixer with a stirring blade to form a resin coating layer on surfaces of the magnetic particles and taking a carrier having the resin coating layer out of the mixer. This method reduces color dullness of the obtained image more than a method in which the peripheral speed of the stirring blade is lower than 0.2 m/s or higher than 2.0 m/s, or the peripheral speed×the stirring time is lower than $1\times10^3$ m or higher than $4\times10^3$ m in the stirring conditions after the solvent is evaporated and dried by heating in the mixer until the carrier is taken out of the mixer in the coating step.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a carrier for electrostatic charge image development, the method including: coating magnetic particles by adding the magnetic particles and a coating liquid containing a resin and a solvent to a mixer with a stirring blade to form a resin coating layer on surfaces of the magnetic particles and taking a carrier having the resin coating layer out of the mixer, wherein, in the coating, stirring conditions after the solvent is evaporated and dried by heating in the mixer until the carrier is taken out of the mixer satisfy Formula 1 below and Formula 2 below:

$$0.2 \leq \text{peripheral speed } \pi Dn \text{ (m/s) of stirring blade} \leq 2.0 \quad \text{Formula 1,}$$

$$1\times10^3 \leq \text{stirring workload (peripheral speed} \times \text{stirring time T)} \leq 4\times10^3 \quad \text{Formula 2,}$$

where D represents a diameter (m) of the stirring blade, n represents the number of revolutions (rps) of the stirring blade, and T represents a time (s) from a time point at which, after a load power of the stirring blade before drying of the solvent increases with drying until completion of drying, a load power of the stirring blade decreases to 1.3 times or less the load power of the stirring blade before drying to a time point at which stirring in the mixer is stopped.

BRIEF DESCRIPTION OF THE DRAWINGS

Exemplary embodiments of the present disclosure will be described in detail based on the following figures, wherein.

DETAILED DESCRIPTION

Figure 1:
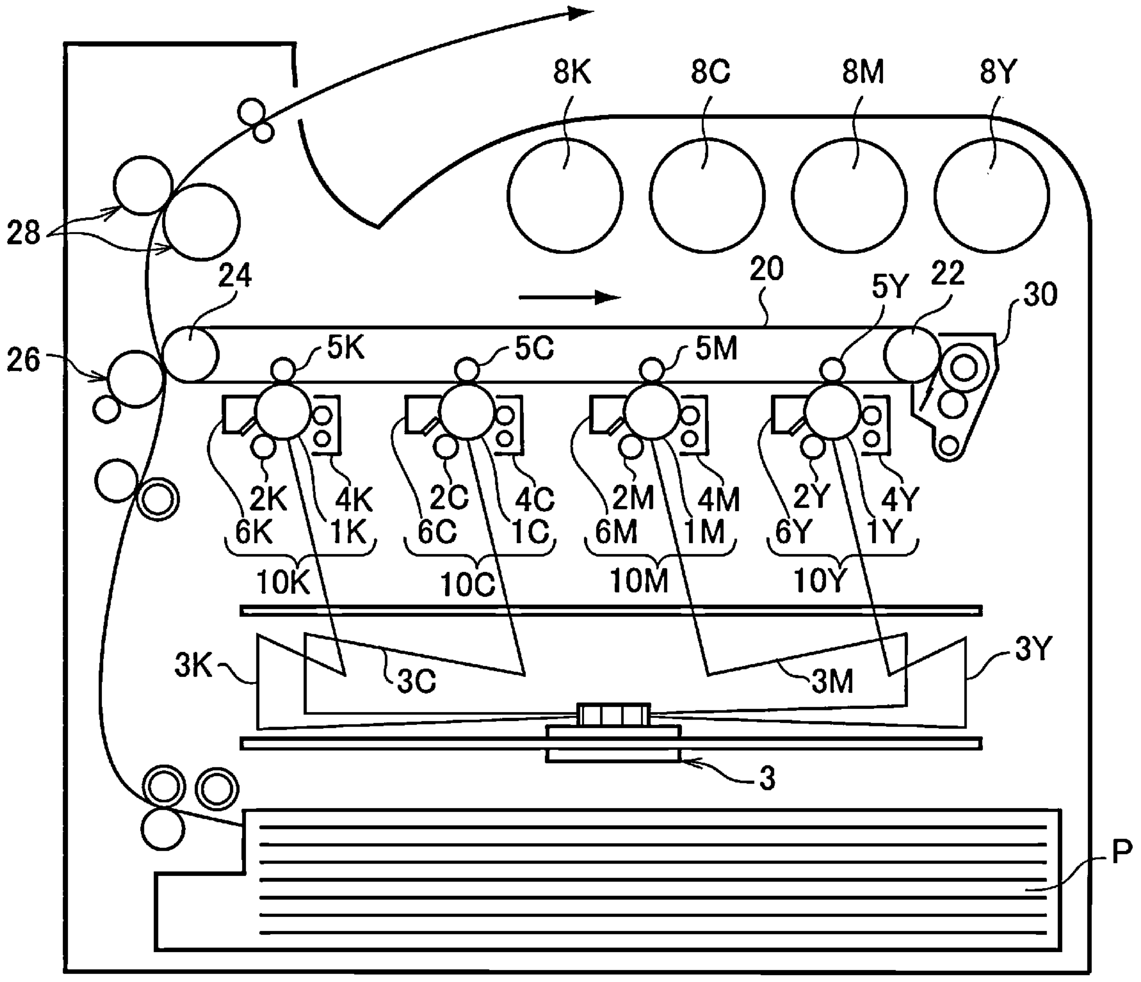
FIG. 1 is a schematic structural view of an example of an image forming apparatus according to an exemplary embodiment.

Exemplary embodiments of the present disclosure will be described below. The following description and Examples are for illustrating the exemplary embodiments, but are not intended to limit the scope of the exemplary embodiments.

The numerical ranges expressed by using "to" in the present disclosure indicate ranges inclusive of the numerical values before and after "to" as the minimum value and the maximum value.

In the numerical ranges described stepwise in the present disclosure, the upper limit or the lower limit of one numerical range may be replaced by the upper limit or the lower limit of another numerical range. The upper limit or lower limit of any numerical range described in the present disclosure may be replaced by a value described in Examples.

In the present disclosure, the term "step" includes not only an independent step but also a step that cannot be clearly distinguished from other steps but may accomplish an intended purpose.

In the description of exemplary embodiments with reference to the drawings in the present disclosure, the structures of the exemplary embodiments are not limited to the structures illustrated in the drawings. The sizes of members in each figure are schematic, and the relative relationship between the sizes of the members is not limited to what is illustrated.

In the present disclosure, each component may contain two or more corresponding substances. In the present disclosure, the amount of each component in a composition refers to, when there are two or more substances corresponding to each component in the composition, the total amount of the substances present in the composition, unless otherwise specified.

In the present disclosure, each component may contain two or more types of particles corresponding to each component. The particle size of each component refers to, when there are two or more types of particles corresponding to each component in the composition, the particle size of a mixture of two or more types of particles present in the composition, unless otherwise specified.

In the present disclosure, the "(meth)acrylic" refers to at least one of acrylic and methacrylic, and the "(meth)acrylate" refers to at least one of acrylate and methacrylate.

In the present disclosure, carbon black is not inorganic particles.

In the present disclosure, the "toner for electrostatic charge image development" is also referred to as a "toner", the "carrier for electrostatic charge image development" is also referred to as a "carrier", and the "electrostatic charge image developer" is also referred to as a "developer".

Method for Producing Carrier for Electrostatic Charge Image Development

A method for producing a carrier for electrostatic charge image development according to an exemplary embodiment includes a coating step of adding magnetic particles and a coating liquid containing a resin and a solvent to a mixer with a stirring blade to form a resin coating layer on surfaces of the magnetic particles and taking a carrier having the resin coating layer out of the mixer. In the coating step, the stirring conditions after the solvent is evaporated and dried by heating in the mixer until the carrier is taken out of the mixer satisfy Formula 1 below and Formula 2 below.

$$0.2 \leq \text{peripheral speed } \pi Dn \text{ (m/s) of stirring blade} \leq 2.0 \quad \text{Formula 1,}$$

$$1\times10^3 \leq \text{stirring workload (peripheral speed} \times \text{stirring time T)} \leq 4\times10^3 \quad \text{Formula 2.}$$

In Formula 1 and Formula 2, D represents a diameter (m) of the stirring blade, n represents the number of revolutions (rps) of the stirring blade, and T represents the time (s) from the time point at which, after the load power of the stirring blade before drying of the solvent increases with drying until completion of drying, the load power of the stirring blade decreases to 1.3 times or less the load power of the stirring blade before drying to the time point at which stirring in the mixer is stopped.

The carrier for electrostatic charge image development according to the exemplary embodiment is a carrier for electrostatic charge image development produced by the method for producing a carrier for electrostatic charge image development according to the exemplary embodiment.

In a carrier production method using dip coating, a solvent is dried in a stirring vacuum mixer before aggregate powder is crushed, cooled, and taken out. However, the shear force generated by stirring that acts on the carrier after drying increases exposure of the surface of the core (magnetic particles) due to peeling of the resin coating layer or the free resin powder of the resin component of the resin coating layer. The components of coating fragments, such as resin pieces generated by the peeling and free resin powder, may be developed together with toner and, in particular, yellow toner, clear toner, or other toners may generate color dullness derived from the components of coating fragments.

The aggregates formed in the drying step are crushed under the shear force (proportional to the peripheral speed) generated by rotation of the stirring blade after drying of the solvent and the stirring workload (proportional to peripheral speed×time). If the peripheral speed is too low, or if the stirring workload is small at a high peripheral speed, the produced carrier is not completely crushed to primary particles, resulting in a decrease in the yield of carrier particles having a certain particle size or less. If the peripheral speed is too high, or if the stirring workload is large at a low peripheral speed, the shear force and frictional force acting on the carrier increase coating fragments generated by peeling of the resin coating layer. This further proceeds to exposure of the surface of the core.

These phenomena become noticeable when the carrier has a large amount of coating resin or when conductive particles, such as carbon black, are added to the resin coating layer. With regard to the carrier having a resin coating layer containing the conductive particles, application of a certain stirring workload or higher can fix the conductive particles to the resin coating layer to reduce the amount of free conductive particles.

In the method for producing a carrier for electrostatic charge image development according to the exemplary embodiment, the stirring conditions after the solvent is evaporated and dried by heating in the mixer until the carrier is taken out of the mixer in the coating step satisfy Formula 1 below and Formula 2 below. With these conditions satisfied, the produced carrier is crushed to primary particles, and the shear force (peripheral speed) is reduced with the resin coating layer after drying not being completely solidified. This method not only reduces the exposure of the core due to peeling of the resin coating layer but also suppresses generation of free resin powder even in long-term printing while ensuring the strength of the resin coating layer, reducing color dullness of the obtained image.

The method for producing a carrier for electrostatic charge image development according to the exemplary embodiment will be described below in detail.

Coating Step

The method for producing a carrier for electrostatic charge image development according to the exemplary embodiment includes a coating step of adding magnetic particles and a coating liquid containing a resin and a solvent to a mixer with a stirring blade to form a resin coating layer on surfaces of the magnetic particles and taking a carrier having the resin coating layer out of the mixer.

In the coating step, the stirring conditions after the solvent is evaporated and dried by heating in the mixer until the carrier is taken out of the mixer satisfy Formula 1 below and Formula 2 below.

$$0.2 \leq \text{peripheral speed } \pi Dn \text{ (m/s) of stirring blade} \leq 2.0 \quad \text{Formula 1,}$$

$$1\times10^3 \leq \text{stirring workload (peripheral speed} \times \text{stirring time T)} \leq 4\times10^3 \quad \text{Formula 2.}$$

In Formula 1 and Formula 2, D represents a diameter (m) of the stirring blade, n represents the number of revolutions (rps) of the stirring blade, and T represents the time (s) from the time point at which, after the load power of the stirring blade before drying of the solvent increases with drying until completion of drying, the load power of the stirring blade decreases to 1.3 times or less the load power of the stirring blade before drying to the time point at which stirring in the mixer is stopped.

π represents the ratio of the circumference of a circle to its diameter.

Figure 3:
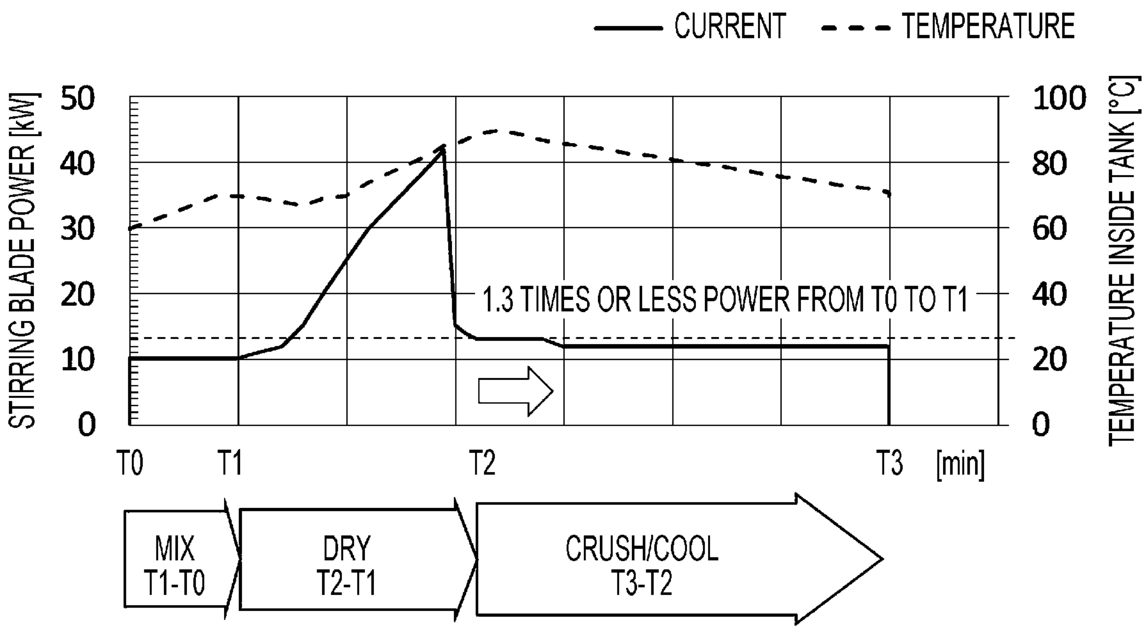
FIG. 3 is a schematic graph illustrating changes in the load power of the stirring blade and changes in the temperature inside the mixer over time in an example of a method for producing a carrier for electrostatic charge image development according to an exemplary embodiment.

In the coating step, for example, the load power of the stirring blade may change as illustrated in FIG. 3.

FIG. 3 is a schematic graph illustrating changes in the load power of the stirring blade and changes in the temperature inside the mixer over time in an example of the method for producing a carrier for electrostatic charge image development according to the exemplary embodiment.

In FIG. 3, the left vertical axis represents the load power (kW) of the stirring blade, the right vertical axis represents the temperature (° C.) inside the mixer, and the horizontal axis represents the elapsed time (min).

In FIG. 3, at T0, the coating liquid and the magnetic particles are charged into the mixer. From T0 to T1, the coating liquid and the magnetic particles are being mixed. From T1 to T2, the solvent contained in the coating liquid is being evaporated under reduced pressure until the carrier is completely dried. From T2 to T3, the dried carrier is being crushed and, as desired, cooled. At T3, stirring in the mixer is ended, and the carrier is taken out of the mixer.

The changes in the load power of the stirring blade illustrated in FIG. 3 are as described below.

From T0 to T1, the load power of the stirring blade is substantially constant.

From T1 to T2, the viscosity of the mixture of the coating liquid and the magnetic particles in the mixer increases as the solvent evaporates, and the load power of the stirring blade continues to increase until the carrier is completely dried. After the carrier is completely dried, the load power of the stirring blade rapidly decreases to 1.3 times or less the load power of the stirring blade from T0 to T1.

From T2 to T3, the load power of the stirring blade is substantially constant again.

T represents the time from T2 to T3.

The changes in the temperature inside the mixer illustrated in FIG. 3 are as described below.

From T0 to T1, the temperature inside the mixer gradually increases to the set temperature (e.g., jacket temperature).

From T1 to T2, the temperature does not increase steadily because of the heat of vaporization of the solvent but generally increases gradually as the carrier dries.

From T2 to T3, the temperature inside the mixer gradually increases according to the temperature set at drying and gradually decreases according to the set cooling temperature (e.g., jacket temperature) when cooling starts.

The mixer used in the exemplary embodiment may be a mixer having a stirring blade. The mixer may be any known mixer, but preferably a vacuum mixer in view of dryness.

The mixer used in the exemplary embodiment is preferably a batch-type mixer, more preferably a batch-type vacuum mixer in order to improve mixing properties and reduce color dullness of the obtained image.

The batch-type mixer may be a blade-type kneader, where the rotation shaft of the blade may be in the vertical direction or in the horizontal direction. Examples of the vertical shaft mixer include Spiral Mixer available from Aicohsha Mfg Co. Ltd., and Planetary Mixer available from Inoue MFG. Inc. Examples of the horizontal shaft mixer include Kneader available from Inoue MFG. Inc. Of these mixers, a horizontal biaxial kneader is preferred in order to improve mixing properties and reduce color dullness of the obtained image.

The mixer may have a temperature-controlling structure capable of heating and cooling under reduced pressure in the mixing tank, and a mechanism capable of detecting the stirring power of the stirring blade.

The temperature-controlling structure is not limited and may be a jacketed structure.

Examples of the shape of the stirring blade include, but are not limited to, Banbury blades, sigma blades, Z-type blades, spiral blades, and fishtail blades.

The stirring blade may have any diameter D according to the mixer used. The diameter D of the stirring blade in the exemplary embodiment refers to the maximum outer diameter of an area of a plane that the stirring blade passes through as the stirring blade rotates, the plane being perpendicular to the rotation shaft.

The number N of revolutions of the stirring blade is preferably 10 rpm or more and 200 rpm or less, more preferably 15 rpm or more and 160 rpm or less, still more preferably 20 rpm or more and 160 rpm or less in view of the speed for producing the carrier and in order to reduce color dullness of the obtained image.

The clearance (gap) between the stirring tank and the stirring blade in the mixer is not limited and set according to the mixer used. This is because the carrier accumulating on the bottom is not completely crushed with a wide clearance, and the shear force at crushing is determined not only by the peripheral speed of the stirring blade and the stirring workload but also by the clearance. The clearance may be as narrow as possible, but there is a limitation on clearance because of the restrictions on apparatus production. With regard to the clearance between the periphery of the stirring blade and the stirring tank, the clearance/the diameter of the stirring blade is preferably 5% or less, more preferably 3.5% or less.

The time T from the time point at which, after the start of drying of the solvent, the load power of the stirring blade decreases to the load power of the stirring blade before drying to the time point at which the carrier is taken out of the mixer is preferably 5 minutes or more and 280 minutes or less, more preferably 10 minutes or more and 80 minutes or less, still more preferably 20 minutes or more and 70 minutes or less in order to reduce color dullness of the obtained image.

In other words, the time T is preferably 300 seconds or more and 16,800 seconds or less, more preferably 600 seconds or more and 4,800 seconds or less, still more preferably 1,200 seconds or more and 4,200 seconds or less in order to reduce color dullness of the obtained image.

During the coating step, stirring with the stirring blade may be continued.

In the coating step, the stirring conditions after the solvent is evaporated and dried by heating in the mixer until the carrier is taken out of the mixer preferably satisfy Formula 1-1 below and more preferably satisfy Formula 1-2 below in order to reduce color dullness of the obtained image.

$$0.2 \leq \text{peripheral speed } \pi Dn \text{ (m/s) of stirring blade} \leq 2.0 \quad \text{Formula 1-1,}$$

$$0.7 \leq \text{peripheral speed } \pi Dn \text{ (m/s) of stirring blade} \leq 2.0 \quad \text{Formula 1-2.}$$

In the coating step, the stirring conditions after the solvent is evaporated and dried by heating in the mixer until the carrier is taken out of the mixer preferably satisfy Formula 2-1 below and more preferably satisfy Formula 2-2 below in order to reduce color dullness of the obtained image.

$$1.1\times10^{3}\leq\text{stirring workload (peripheral speed}\times\text{stirring time T)}\leq3.5\times10^{3} \quad \text{Formula 2-1,}$$

$$1.4\times10^{3}\leq\text{stirring workload (peripheral speed}\times\text{stirring time T)}\leq2.5\times10^{3} \quad \text{Formula 2-2.}$$

To improve the coating properties of the resin coating layer and reduce color dullness of the obtained image, the maximum temperature of the carrier in the coating step may be Tg−20° C. or higher and Tg or lower, where Tg is the glass transition temperature of the resin contained in the resin coating layer. This because the resin is softened by increasing the temperature close to Tg to form a uniform resin coating layer.

When the resin coating layer contains two or more resins, the glass transition temperature Tg of the resin contained in the resin coating layer refers to the lowest glass transition temperature Tg among those of two or more resins contained in the resin coating layer.

In the coating step, the solvent may be evaporated by heating under normal pressure, evaporated under reduced pressure, or evaporated by heating under reduced pressure, but preferably evaporated by heating under reduced pressure because the carrier can be dried without increasing the temperature from the boiling point of the solvent to the glass transition temperature Tg of the resin or higher.

The atmospheric pressure in the coating step is not limited and appropriately selected according to the glass transition temperature of the resin and the solvent used. The atmospheric pressure is preferably 0.1 kPa-a or more and 80 kPa-a or less, more preferably 5 kPa-a or more and 60 kPa-a or less in view of the solvent evaporation rate and in order to reduce color dullness of the obtained image.

kPa-a represents the atmospheric pressure (kPa) based on the absolute pressure.

The pressure-reducing unit in the mixer is not limited and may be a known pressure reducing-unit, such as a vacuum pump.

The evaporated solvent may be collected by a solvent-collecting unit, such as a cooling trap.

To reduce color dullness of the obtained image, the temperature of the carrier in taking the carrier out of the mixer may be Tg−20° C. or lower, where Tg is the glass transition temperature of the resin contained in the resin coating layer.

When the cooling step described below is carried out after the coating step, the temperature of the carrier in taking the carrier out of the mixer is preferably Tg or lower, more preferably Tg−10° C. or lower, where Tg is the glass transition temperature of the resin contained in the resin coating layer.

The reason for this is as described below. The carrier crushed in the mixer is collected in a container and stored in the container until the carrier is sifted through a predetermined mesh screen. As the storage temperature at this time is closer to the glass transition temperature Tg of the coating resin of the carrier, the coating resin is less completely solidified. The conditions of the resin coating layer may thus be uneven according to the sites of storage of the carrier in the tank because of the self-weight of the carrier in the tank, so that the free resin amount may become unstable. For this, when the cooling step described below is carried out, the carrier may be cooled in a cooling device subsequent to the coating step in order to suppress generation of coating fragments.

The amounts of the coating liquid and the magnetic particles used in the coating step are not limited and appropriately selected according to, for example, the disperser used.

The ratio between the amount of the coating liquid and the amount of the magnetic particles used is appropriately selected according to, for example, the concentration of the coating liquid and the thickness of the resin coating layer to be formed.

In the coating step, other components to be contained in the resin coating layer, such as particles, other than the coating liquid and the magnetic particles may further be added to the mixer.

The details of the coating liquid containing the resin and the solvent, the magnetic particles, and other components used in the coating step will be summarized below.

Cooling Step

The method for producing a carrier for electrostatic charge image development according to the exemplary embodiment may further include, subsequent to the coating step, a cooling step of cooling the carrier to Tg−20° C. or lower in a cooling device, where Tg is the glass transition temperature of the resin contained in the resin coating layer in order to reduce color dullness of the obtained image.

The cooling device is, for example, a fluidized bed device, a puddle-type mixer, or a screw mixer, but preferably a fluidized bed device in order to reduce color dullness of the obtained image. Cooling with a fluidized bed device capable of mixing without stirring further reduces generation of free resin to provide a carrier with more stable quality. Examples of the fluidized bed device include, but are not limited to, a fluidized bed device with only fluidizing air, and a vibrating fluidized bed with fluidization assisted by vibration.

The fluidized bed device may be a device capable of discharging, from the bottom of the device, dehumidified gas at a temperature lower than or equal to the cooling attainment temperature of an object to be cooled. According to the required cooling capacity, gas may be cooled to room temperature or lower, or the fluidized bed device may have a frame with a jacketed structure, in which cooling water may be circulated.

The fluidized bed device is not limited, and may be any known fluidized bed device.

The "subsequent to the coating step" means that the carrier taken out of the mixer in the coating step is directly charged into a fluidized bed device, and the carrier may be charged into a fluidized bed device directly from the mixer in the coating step.

The cooling rate of the fluidizing device depends on the temperature of the fluidizing gas, the flow rate of the fluidizing gas per unit weight of the carrier, and the efficiency of heat transfer determined by the stirring conditions in the tank determined by the superficial velocity based on the minimum fluidization velocity Umf described below. As the temperature of the fluidizing gas decreases and the fluidization velocity increases, the cooling time shortens. However, as the fluidization velocity increases, the frictional force between the carrier particles increases in the device, generating coating fragments.

The superficial velocity v (m/s) of the fluidizing gas during cooling in the cooling step is preferably 2 times or more and 10 times or less the minimum fluidization velocity Umf, more preferably 3 times or more and 8 times or less the minimum fluidization velocity Umf, still more preferably 3 times or more and 5 times or less the minimum fluidization velocity Umf in view of the cooling rate and in order to reduce color dullness of the obtained image.

The minimum fluidization velocity Umf can be experimentally obtained from the following formula and the flow rate of the fluidization velocity at the change point where the pressure of the fluidizing gas starts to become stable after increasing.

Minimum fluidization velocity Umf (m/s)=(flow rate ($m^3$/s) at change point)/(cross-sectional area ($m^2$) of fluidizing device)

The superficial velocity v of the fluidizing gas during cooling in the cooling step is not limited, but preferably 10 mm/s or higher and 100 mm/s or lower, more preferably 20 mm/s or higher and 50 mm/s or lower.

Examples of the fluidizing gas in the fluidizing device include, but are not limited to, air, nitrogen, and argon. Of these, air is preferred.

The fluidizing gas is preferably dehumidified gas, preferably gas with a relative humidity of 30% or less, more preferably gas with a relative humidity of 20% or less, still more preferably gas with a relative humidity of 10% or less.

To reduce color dullness of the obtained image, in the cooling step, the carrier is preferably cooled to Tg−20° C. or lower, more preferably cooled to Tg−25° C. or lower, still more preferably cooled to 25° C. or higher and Tg−30° C. or lower, where Tg is the glass transition temperature of the resin contained in the resin coating layer.

The cooling time in the cooling step is not limited, but preferably 10 minutes or more and 360 minutes or less, more preferably 30 minutes or more and 240 minutes or less, still more preferably 60 minutes or more and 150 minutes or less in view of the speed for producing the carrier and in order to reduce color dullness of the obtained image.

The method for producing a carrier for electrostatic charge image development according to the exemplary embodiment may include other steps in addition to the coating step and the cooling step.

Other steps are not limited and may include known steps.

The method for producing a carrier for electrostatic charge image development according to the exemplary embodiment may further include a step of preparing magnetic particles and a step of preparing a coating liquid containing a resin and a solvent.

Physical Properties of Carrier

The volume average particle size of the carrier for electrostatic charge image development produced by the method for producing a carrier for electrostatic charge image development according to the exemplary embodiment is preferably 10 μm or more and 500 μm or less, more preferably 15 μm or more and 100 μm or less, still more preferably 20 μm or more and 60 μm or less.

The volume average particle sizes of the magnetic particles and the carrier in the exemplary embodiment are determined by using a laser diffraction particle size distribution analyzer LA-700 (available from HORIBA, Ltd). Specifically, the volume cumulative distribution is drawn from the smaller particle size as a function of divided particle size ranges (channels) of the particle size distribution measured by the analyzer, and the particle size at 50% cumulative volume is defined as a volume average particle size.

The amount of the resin coating layer in the carrier for electrostatic charge image development produced by the method for producing a carrier for electrostatic charge image development according to the exemplary embodiment is preferably 0.5 mass % or more and 10 mass % or less, more preferably 1 mass % or more and 5 mass % or less relative to the total mass of the carrier, in view of the thickness stability of the resin coating layer and the charging characteristics.

The free resin amount in the carrier for electrostatic charge image development produced by the method for producing a carrier for electrostatic charge image development according to the exemplary embodiment is preferably 200 ppm or less, more preferably 100 ppm or less, still more preferably 75 ppm or less, yet still more preferably 50 ppm or less in order to reduce color dullness of the obtained image.

The method for measuring the free resin amount in the carrier for electrostatic charge image development according to the exemplary embodiment is as described below.

A certain amount of the carrier is measured and dispersed in water, and the dispersion is filtered with the carrier fixed with magnet. The filter paper is dried, and the free resin amount is calculated from the following formula based on a difference in mass before and after filtration and the measured carrier amount.

Free resin amount (ppm)=increase in filter paper (g)/carrier (g)

The proportion of aggregates after 75 μm sifting in the carrier for electrostatic charge image development produced by the method for producing a carrier for electrostatic charge image development according to the exemplary embodiment is preferably 5 number % or less, more preferably 1 number % or less, still more preferably 0.1 number % or less, yet still more preferably 0.01 number % or less in order to reduce color dullness of the obtained image.

The method for measuring the proportion of aggregates after 75 μm sifting in the carrier for electrostatic charge image development according to the exemplary embodiment is as described below.

The carrier is sifted through a sieve with a mesh size of 75 μm, and the sifted carrier particles are spread so as to overlap each other as little as possible. Photographs of the carrier are taken with a scanning electron microscope (SEM) at a magnification of 350 times, and the percentage of the number of carrier particles that are not crushed to primary particles relative to the number of carrier particles in one field of view is measured.

To suppress changes in density in the obtained image, the fluidity of the carrier for electrostatic charge image development in the exemplary embodiment is preferably 20 seconds/50 g or more and 50 seconds/50 g or less, more preferably 22 seconds/50 g or more and 35 seconds/50 g or less, still more preferably 25 seconds/50 g or more and 30 seconds/50 g or less.

The fluidity of the carrier for electrostatic charge image development in the exemplary embodiment is measured at 25° C. and 50% RH in accordance with JIS 22502 (2020).

Magnetic Particles

Known magnetic particles are used as magnetic particles used in the exemplary embodiment.

Known materials are used as the magnetic particles. Examples of the magnetic particles include particles made of magnetic metals, such as iron, nickel, and cobalt; alloys of these magnetic metals and manganese, chromium, and rare earth metals; magnetic oxides, such as iron oxide, ferrite, and magnetite; and resin-dispersed magnetic particles in which conductive materials and other materials are dispersed in matrix resin.

Examples of the resin used in the resin-dispersed magnetic particles include, but are not limited to, polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin including an organosiloxane bond, and modified products thereof, fluororesin, polyester, polycarbonate, phenolic resin, and epoxy resin.

Of these, the magnetic particles are preferably magnetic oxide particles, more preferably ferrite particles.

Ferrite Particles

Ferrite is generally represented by $(MO)_X(Fe_2O_3)_Y$. In the formula, M is mainly composed of Mn, but Mn can be combined with at least one or two or more selected from the group consisting of Li, Ca, Sr, Sn, Cu, Zn, Ba, Fe, Ti, Ni, Al, Co, and Mo. X and Y represent the molar ratio and satisfy the condition X+Y=100. In general, the properties of ferrite particles change with their composition and structure.

The ferrite particles used in the exemplary embodiment are not limited and can be prepared, for example, as described below.

A powder of a metal oxide or metal salt serving as a material is mixed and calcined by using, for example, a rotary kiln to produce a calcined product. Examples of the metal oxide or metal salt serving as a material include $Fe_2O_3$, $MnO_2$, $SrCO_3$, and $Mg(OH)_2$. For example, the amount of strontium in the ferrite particles is controlled at 0.1 mass % or more and 1.0 mass % or less by adjusting the amount of $SrCO_3$. The calcination temperature is, for example, 800° C. or higher and 1,000° C. or lower, and the calcination time is, for example, 6 hours or more and 10 hours or less. The obtained calcined product is ground by a known grinding method, specifically, by adding polyvinyl alcohol, water, a surfactant, and a defoamer, and grinding the calcined product by using, for example, a mortar, a ball mill, or a jet mill. The calcined product is ground to, for example, an average particle size of 4 μm or more and 10 μm or less. Next, the ground calcined product is granulated and dried by using a spray dryer. The dried calcined product is calcined again (re-calcination) to remove the contained organic matter and form a re-calcined product. The re-calcination temperature is, for example, 800° C. or higher and 1,000° C. or lower, and the re-calcination time is, for example, 5 hours or more and 10 hours or less. To the obtained re-calcined product is added polyvinyl alcohol, water, a surfactant, and a defoamer. The re-calcined product is ground by using, for example, a mortar, a ball mill, or a jet mill. The re-calcined product is ground to, for example, an average particle size of 4 μm or more and 8 μm or less. Next, the ground re-calcined product is granulated and dried by using a spray dryer. The dried granules are fired (sintered) by using, for example, a rotary kiln to produce a sintered product. The sintering temperature is, for example, 1,000° C. or higher and 1,400° C. or lower, and the sintering time is, for example, 3 hours or more and 6 hours or less. The sintered product is subsequently subjected to a crushing step and a classifying step to produce ferrite particles.

The volume average particle size of the magnetic particles used in the exemplary embodiment is preferably 10 μm or more and 500 μm or less, more preferably 15 μm or more and 100 μm or less, still more preferably 20 μm or more and 60 μm or less.

The average particle size of the sintered product or the ferrite particles is determined by using a laser diffraction/scattering particle size distribution analyzer (LS Particle Size Analyzer: LS13 320, available from Beckman Coulter Inc.). The cumulative distribution is drawn from the smaller particle size as a function of divided particle size ranges (channels) of the obtained particle size distribution, and the particle size at 50% cumulative volume is defined as a volume average 50% particle size.

To improve the long-term stability of image quality and to suppress changes in density, the BET specific surface area of the magnetic particles is preferably 0.10 $m^2/g$ or more and 0.35 $m^2/g$ or less, more preferably 0.11 $m^2/g$ or more and 0.28 $m^2/g$ or less, still more preferably 0.12 $m^2/g$ or more and 0.24 $m^2/g$ or less. With the BET specific surface area in this range, an appropriate amount of coating resin may fill in gaps between the magnetic particles to suppress degradation of the resin coating layer caused by the anchoring effect, which may improve the long-term stability of image quality and may suppress changes in density.

The BET specific surface area of the magnetic particles is determined by using a specific surface area analyzer SA 3100 (available from Beckman Coulter, Inc.) with nitrogen purging and the 3-point method. Specifically, 5 g of the magnetic particles are placed in a cell and deaerated at 60° C. for 120 minutes by using a mixed gas of nitrogen and helium (30:70).

In a method for separating the magnetic particles from the carrier, more specifically, 20 g of the resin-coated carrier is placed in 100 mL of toluene. An ultrasonic wave is applied at 40 kHz for 30 seconds. The magnetic particles and the resin solution are separated by using filter paper selected according to the particle size. The magnetic particles remaining on the filter paper are washed with 20 mL of toluene by pouring toluene from above. Next, the magnetic particles remaining on the filter paper are collected. The collected magnetic particles are placed similarly in 100 mL of toluene, and an ultrasonic wave is applied at 40 kHz for 30 seconds. Similarly, filtration is performed, and the obtained magnetic particles are washed with 20 mL of toluene and then collected. This process is repeated 10 times in total. The finally collected magnetic particles are dried, and the BET specific surface area is measured under the above conditions.

The arithmetic mean height Ra (JIS B0601:2001) of the roughness curve of the magnetic particles is preferably 0.1 μm or more and 1 μm or less, more preferably 0.2 μm or more and 0.8 μm or less.

The arithmetic mean height Ra of the roughness curve of the magnetic particles is determined by measuring the roughness curve at a cut-off value of 0.08 mm through observation of the magnetic particles at an appropriate magnification (e.g., a magnification of 1000 times) using a surface profiler (e.g., "ultra-depth color 3D profile measuring microscope VK-9700" available from KEYENCE Corporation) and extracting a sampling length of 10 μm in the direction of the mean line from the roughness curve. The arithmetic mean height Ra of 100 magnetic particles is calculated.

Regarding the magnetic force of the magnetic particles, the saturation magnetization in a magnetic field of 3,000 oersted is preferably 50 emu/g or more, more preferably 60 emu/g or more. The saturation magnetization is measured by using a vibrating sample magnetometer VSMP10-15 (available from Toei Industry Co., Ltd.). The test sample is placed in a cell with an inner diameter of 7 mm and a height of 5 mm and set in the magnetometer. In the measurement, a magnetic field is applied and swept up to 3,000 oersted. Next, the applied magnetic field is reduced, and a hysteresis curve is recorded on recording paper. The saturation magnetization, the residual magnetization, and the coercivity are determined from the data of the curve.

The volume electrical resistance (volume resistivity) of the magnetic particles is preferably $1\times10^5$ Ω·cm or more and $1\times10^9$ Ω·cm or less, more preferably $1\times10^7$ Ω·cm or more and $1\times10^9$ Ω·cm or less.

The volume electrical resistance (Ω·cm) of the magnetic particles is measured as described below. The test sample is placed flat on the surface of a circular jig provided with an 20 $cm^2$ electrode plate such that the test sample has a thickness of 1 mm or more and 3 mm or less to form a layer. A 20 $cm^2$ electrode plate is placed on the layer to sandwich the layer between the electrode plates. After a load of 4 kg is applied to the electrode plate placed on the layer to remove gaps between the particles of the test sample, the thickness (cm) of the layer is measured. The electrodes above and below the layer are connected to an electrometer and a high-voltage power generator. A high voltage is applied across the electrodes to generate an electric field of 103.8 V/cm, and the current (A) flowing at this time is read out. The measurement environments are a temperature of 20° C. and a relative humidity of 50%. The calculation formula for the volume electrical resistance (Ω·cm) of the test sample is as described below.

$$R=E\times20/(I-I_0)/L$$

In the formula, R represents the volume electrical resistance (Ω·cm) of the test sample, E represents the applied voltage (V), I represents the current (A), $I_0$ represents the current (A) at an applied voltage of 0 V, and L represents the thickness (cm) of the layer. A coefficient of 20 represents the area ($cm^2$) of each electrode plate.

Resin Coating Layer

The carrier for electrostatic charge image development produced by the method for producing a carrier for electrostatic charge image development according to the exemplary embodiment has a resin coating layer that coats the magnetic particles.

Examples of the resin constituting the resin coating layer include styrene-acrylate copolymer; polyolefin resins, such as polyethylene and polypropylene; polyvinyl or polyvinylidene resins, such as polystyrene, acrylic resin, polyacrylonitrile, polyvinyl acetate, polyvinyl alcohol, polyvinyl butyral, polyvinyl chloride, polyvinylcarbazole, polyvinyl ether, and polyvinylketone; vinyl chloride-vinyl acetate copolymer; straight-chain silicone resin having organosiloxane bonds, and modified products thereof; fluororesins, such as polytetrafluoroethylene, polyvinyl fluoride, polyvinylidene fluoride, and polychlorotrifluoroethylene; polyester; polyurethane; polycarbonate; amino resins, such as urea-formaldehyde resin; and epoxy resin.

To improve charging characteristics, control adhesion of external additives, and suppress changes in density, the resin constituting the resin coating layer may include acrylic resin. The amount of acrylic resin is preferably 50 mass % or more relative to the total mass of the resin in the resin coating layer, more preferably 80 mass % or more relative to the total mass of the resin in the resin coating layer.

To suppress changes in density, the resin coating layer may contain an acrylic resin having an alicyclic structure. The polymer component of the acrylic resin having an alicyclic structure may be a lower alkyl ester of (meth) acrylic acid (e.g., alkyl (meth)acrylate with a C1-C9 alkyl group). Specific examples include methyl (meth)acrylate, ethyl (meth)acrylate, propyl (meth)acrylate, butyl (meth) acrylate, hexyl (meth)acrylate, cyclohexyl (meth)acrylate, and 2-ethylhexyl (meth)acrylate. These monomers may be used alone or in combination of two or more.

The acrylic resin having an alicyclic structure may include cyclohexyl (meth)acrylate as a polymer component. The amount of the monomer unit derived from cyclohexyl (meth)acrylate contained in the acrylic resin having an alicyclic structure is preferably 75 mass % or more and 100 mass % or less, more preferably 85 mass % or more and 100 mass % or less, still more preferably 95 mass % or more and 100 mass % or less relative to the total mass of the acrylic resin having an alicyclic structure.

The weight average molecular weight of the resin contained in the resin coating layer is preferably less than 300,000, more preferably less than 250,000, still more preferably 5,000 or more and less than 250,000, yet still more preferably 10,000 or more and 200,000 or less. With the weight average molecular weight of the resin in this range, the resin-coated surface of the carrier may have high smoothness, and the amount of external additives attached to the carrier may be reduced to suppress changes in density.

The resin coating layer may contain conductive particles for the purpose of controlling charging and resistance. Examples of the conductive particles include carbon black and conductive inorganic particles among the inorganic particles described below. Of these, carbon black may be used.

In view of the charging characteristics, the amount of the conductive particles contained in the resin coating layer relative to the total mass of the resin coating layer is preferably 0.1 mass % or more and 30 mass % or less, more preferably 0.5 mass % or more and 20 mass % or less, still more preferably 1 mass % or more and 10 mass % or less.

The resin coating layer may contain inorganic particles.

Examples of the inorganic particles contained in the resin coating layer include particles of metal oxides, such as silica, titanium oxide, zinc oxide, and tin oxide; particles of metal compounds, such as barium sulfate, aluminum borate, and potassium titanate; and particles of metals, such as gold, silver, and copper.

Of these inorganic particles, silica particles may be used in order to suppress changes in density.

To suppress changes in density, the arithmetic mean particle size of the inorganic particles in the resin coating layer is preferably 5 nm or more and 90 nm or less, more preferably 5 nm or more and 70 nm or less, still more preferably 5 nm or more and 50 nm or less, yet still more preferably 8 nm or more and 50 nm or less.

In the exemplary embodiment, the average particle size of the inorganic particles contained in the resin coating layer and the average thickness of the resin coating layer are determined by the following methods.

The carrier is embedded in epoxy resin and cut with a microtome to prepare a carrier cross section. The SEM image of the carrier cross section captured with a scanning electron microscope (SEM) is taken into an image processing analyzer and analyzed. One hundred inorganic particles (primary particles) in the resin coating layer are randomly selected, and the equivalent circle diameters (nm) of the inorganic particles are determined. The arithmetic mean is calculated as the average particle size (nm) of the inorganic particles. The thickness (||m) of the resin coating layer is measured at randomly selected 10 points per carrier particle and further measured for 100 particles of the carrier. The arithmetic mean of the thicknesses is calculated as the average thickness (μm) of the resin coating layer.

The surfaces of the inorganic particles may be hydrophobized. Examples of the hydrophobizing agent include known organic silicon compounds having alkyl groups (e.g., a methyl group, an ethyl group, a propyl group, and a butyl group). Specific examples include alkoxysilane compounds, siloxane compounds, and silazane compounds. Of these compounds, the hydrophobizing agent may be a silazane compound, specifically, hexamethyldisilazane. The hydrophobizing agent may be used alone or in combination of two or more.

Examples of the method for hydrophobizing the inorganic particles with a hydrophobizing agent include a method using supercritical carbon dioxide and involving dissolving a hydrophobizing agent in supercritical carbon dioxide and attaching the hydrophobizing agent to the surfaces of the inorganic particles; a method involving attaching a hydrophobizing agent to the surfaces of the inorganic particles by applying (e.g., spraying or coating) a solution containing the hydrophobizing agent and a solvent for dissolving the hydrophobizing agent to the surfaces of the inorganic particles in the atmosphere; a method involving, in the atmosphere, adding a solution containing a hydrophobizing agent and a solvent for dissolving the hydrophobizing agent to an inorganic-particle dispersion, holding the mixed solution of the inorganic-particle dispersion and the solution, and then drying the mixed solution.

To suppress changes in density, the amount of the inorganic particles contained in the resin coating layer relative to the total mass of the resin coating layer is preferably 10 mass % or more and 60 mass % or less, more preferably 15 mass % or more and 55 mass % or less, still more preferably 20 mass % or more and 50 mass % or less.

The exposed area of the magnetic particles on the carrier surface is preferably 3% or more and 30% or less, more preferably 4% or more and 25% or less, still more preferably 5% or more and 20% or less. The exposed area of the magnetic particles on the carrier can be controlled with the amount of the resin used to form the resin coating layer. As the amount of the resin relative to the amount of the magnetic particles increases, the exposed area decreases.

In other words, the coverage of the resin coating layer on the carrier surface is preferably 70% or more and 97% or less, more preferably 75% or more and 96% or less, still more preferably 80% or more and 95% or less.

The exposed area of the magnetic particles and the coverage of the resin coating layer on the carrier surface are determined by the following methods.

The target carrier and the magnetic particles obtained by removing the resin coating layer from the target carrier are prepared. Examples of the method for removing the resin coating layer from the carrier include a method for removing the resin coating layer by dissolving a resin component in an organic solvent, and a method for removing the resin coating layer by eliminating a resin component with heat at about 800° C. The carrier and the magnetic particles are used as test samples, and the percentages (atomic %) of Fe, C, and O in the sample surface are determined by XPS. The exposed area (%) of the magnetic particles is calculated from (the Fe percentage of the carrier)/(the Fe percentage of the magnetic particles)×100.

The coverage (%) of the resin coating layer is determined from (100−the exposed area of the magnetic particles).

The solvent used to form the resin coating layer is any solvent capable of dissolving or dispersing the resin. Examples of the solvent include aromatic hydrocarbons, such as toluene and xylene; ketones, such as acetone and methyl ethyl ketone; and ethers, such as tetrahydrofuran and dioxane.

Of these solvents, toluene may be used.

The solid content of the coating liquid used to form the resin coating layer is not limited, but preferably 5 mass % or more and 50 mass % or less, more preferably 10 mass % or more and 30 mass % or less.

The coating liquid may contain, for example, the conductive particles or the inorganic particles. In the coating step, for example, the conductive particles or the inorganic particles may be added separately from a coating agent.

The average thickness of the resin coating layer is preferably 0.1 μm or more and 10 μm or less, more preferably 0.2 μm or more and 5 μm or less, still more preferably 0.3 μm or more and 3 μm or less.

The average thickness of the resin coating layer is measured by the following method. The carrier is embedded in epoxy resin or the like and cut with a diamond knife or the like to prepare a thin section. The cross-sectional image of the carrier particles in the thin section is observed and captured with a transmission electron microscope (TEM) or the like. The average thickness of the resin coating layer is obtained by measuring the thickness of the coating layer at 20 points in the cross-sectional image of the carrier particles Electrostatic Charge Image Developer A developer according to an exemplary embodiment is a two-component developer containing a toner and the carrier for electrostatic charge image development produced by the method for producing a carrier for electrostatic charge image development according to the exemplary embodiment. The toner contains toner particles and, as desired, external additives.

A method for producing the developer according to the exemplary embodiment may include the method for producing a carrier for electrostatic charge image development according to the exemplary embodiment.

The mixing ratio (mass ratio) of the carrier and the toner in the developer is preferably from 100:1 to 100:30 (=carrier:toner), more preferably from 100:3 to 100:20.

Toner Particles

The toner particles contain, for example, a binder resin and, as desired, a colorant, a release agent, and other additives.

Binder Resin

Examples of the binder resin include vinyl resins composed of a homopolymer of a monomer or a copolymer of two or more monomers selected from, for example, styrenes (e.g., styrene, p-chlorostyrene, α-methylstyrene), (meth) acrylic acid esters (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate), ethylenically unsaturated nitriles (e.g., acrylonitrile, methacrylonitrile), vinyl ethers (e.g., vinyl methyl ether, vinyl isobutyl ether), vinyl ketones (e.g., vinyl methyl ketone, vinyl ethyl ketone, vinyl isopropenyl ketone), and olefins (e.g., ethylene, propylene, butadiene).

Examples of the binder resin further include non-vinyl resins, such as epoxy resins, polyester resins, polyurethane resins, polyamide resins, cellulose resins, polyether resins, and modified rosins; and mixtures of these non-vinyl resins and the above vinyl resins, and graft polymers produced by polymerization of a vinyl monomer in the presence of these non-vinyl resins.

These binder resins may be used alone or in combination of two or more.

The binder resin may be a polyester resin.

Examples of the polyester resin include known amorphous polyester resins. The polyester resin may be a combination of amorphous polyester resin and crystalline polyester resin. The crystalline polyester resin may be used in the range of 2 mass % or more and 40 mass % or less (preferably 2 mass % or more and 20 mass % or less) relative to the entire binder resin.

The term "crystalline" for resin means that the resin shows a distinct endothermic peak rather than stepwise endothermic changes as being measured by differential scanning calorimetry (DSC) and specifically means that the half width of the endothermic peak measured at a heating rate of 10° C./min is within 10° C.

The term "amorphous" for resin means that the resin shows a half width of more than 10° C., shows stepwise endothermic changes, or shows no distinct endothermic peak.

Amorphous Polyester Resin

Examples of the amorphous polyester resin include a polycondensation polymer of a polycarboxylic acid and a polyhydric alcohol. An amorphous polyester resin may be a commercial product or a synthetic product.

Examples of the polycarboxylic acid include aliphatic dicarboxylic acids (e.g., oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, naphthalene dicarboxylic acid), anhydrides thereof, and lower (e.g., C1 to C5) alkyl esters thereof. Of these, the polycarboxylic acid may be an aromatic dicarboxylic acid.

The polycarboxylic acid may be a combination of a dicarboxylic acid and a trivalent or higher valent carboxylic acid having a crosslinked structure or branched structure. Examples of the trivalent or higher valent carboxylic acid include trimellitic acid, pyromellitic acid, anhydrides thereof, and lower (e.g., C1 to C5) alkyl esters thereof.

The polycarboxylic acid may be used alone or in combination of two or more.

Examples of the polyhydric alcohol include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexane dimethanol, hydrogenated bisphenol A), and aromatic diols (e.g., an ethylene oxide adduct of bisphenol A, and a propylene oxide adduct of bisphenol A). Of these, the polyhydric alcohol is preferably, for example, an aromatic diol or an alicyclic diol, more preferably an aromatic diol.

The polyhydric alcohol may be a combination of a diol and a trihydric or higher polyhydric alcohol having a crosslinked structure or branched structure. Examples of the trihydric or higher polyhydric alcohol include glycerol, trimethylolpropane, and pentaerythritol.

The polyhydric alcohol may be used alone or in combination of two or more.

The glass transition temperature (Tg) of the amorphous polyester resin is preferably 50° C. or higher and 80° C. or lower, more preferably 50° C. or higher and 65° C. or lower.

The glass transition temperature is determined from the DSC curve obtained by differential scanning calorimetry (DSC) and, more specifically, determined in accordance with "extrapolated glass transition onset temperature" described in the method for determining the glass transition temperature in JIS K 7121: 1987 "Testing Methods for Transition Temperatures of Plastics".

The weight average molecular weight (Mw) of the amorphous polyester resin is preferably 5,000 or more and 1,000,000 or less, more preferably 7,000 or more and 500,000 or less.

The number average molecular weight (Mn) of the amorphous polyester resin is preferably 2,000 or more and 100,000 or less.

The molecular weight distribution Mw/Mn of the amorphous polyester resin is preferably 1.5 or more and 100 or less, more preferably 2 or more and 60 or less.

The weight average molecular weight and the number average molecular weight are determined by gel permeation chromatography (GPC). The determination of the molecular weight by GPC is carried out by using a GPC HLC-8120GPC available from Tosoh Corporation as a measuring system, a column TSKgel SuperHM-M (15 cm) available from Tosoh Corporation, and a THF solvent. The weight average molecular weight and the number average molecular weight are calculated from the molecular weight calibration curve created on the basis of the obtained measurement results using a monodisperse polystyrene standard.

The amorphous polyester resin is produced by using a known production method. Specifically, the amorphous polyester resin is produced by using, for example, a method involving causing reaction at a polymerization temperature of 180° C. or higher and 230° C. or lower in a reaction system, as necessary, under reduced pressure while removing water and an alcohol generated during condensation.

If the monomers serving as materials are neither dissolved in nor compatible with each other at the reaction temperature, a solvent with a high boiling point may be added as a solubilizer to form a solution. In this case, the polycondensation reaction is carried out while the solubilizer is distilled off. If a monomer with poor compatibility is present in the copolymerization reaction, the monomer with poor compatibility is previously subjected to condensation with an acid or alcohol that is to undergo polycondensation with the monomer, and the condensate is then subjected to polycondensation with a main component.

Crystalline Polyester Resin

Examples of the crystalline polyester resin include a polycondensate of a polycarboxylic acid and a polyhydric alcohol. The crystalline polyester resin may be a commercial product or a synthetic product.

The crystalline polyester resin may be a polycondensate produced by using a straight-chain aliphatic polymerizable monomer rather than a polymerizable monomer having an aromatic ring in order to easily form the crystal structure.

Examples of the polycarboxylic acid include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., dibasic acids, such as phthalic acid, isophthalic acid, terephthalic acid, and naphthalene-2,6-dicarboxylic acid), anhydrides thereof, and lower (e.g., 1 or more and 5 or less carbon atoms) alkyl esters thereof.

The polycarboxylic acid may be a combination of a dicarboxylic acid and a trivalent or higher valent carboxylic acid having a crosslinked structure or branched structure. Examples of the trivalent carboxylic acid include aromatic carboxylic acids (e.g., 1,2,3-benzenetricarboxylic acid, 1,2,4-benzenetricarboxylic acid, and 1,2,4-naphthalenetricarboxylic acid), anhydrides thereof, and lower (e.g., 1 or more and 5 or less carbon atoms) alkyl esters thereof.

The polycarboxylic acid may be a combination of these dicarboxylic acids and a dicarboxylic acid having a sulfonic acid group or a dicarboxylic acid having an ethylenic double bond.

The polycarboxylic acid may be used alone or in combination of two or more.

Examples of the polyhydric alcohol include aliphatic diols (e.g., straight-chain aliphatic diols having 7 to 20 carbon atoms in the main chain). Examples of aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosandecanediol. Among these, aliphatic diols are preferably 1,8-octanediol, 1,9-nonanediol, and 1,10-decanediol.

The polyhydric alcohol may be a combination of a diol and a trihydric or higher polyhydric alcohol having a cross-linked structure or branched structure. Examples of the trihydric or higher polyhydric alcohol include glycerol, trimethylolethane, trimethylolpropane, and pentaerythritol.

The polyhydric alcohol may be used alone or in combination of two or more.

The polyhydric alcohol preferably includes 80 mol % or more of an aliphatic diol and more preferably includes 90 mol % or more of an aliphatic diol.

The melting temperature of the crystalline polyester resin is preferably 50° C. or higher and 100° C. or lower, more preferably 55° C. or higher and 90° C. or lower, still more preferably 60° C. or higher and 85° C. or lower.

The melting temperature is determined from the DSC curve obtained by differential scanning calorimetry (DSC) in accordance with "melting peak temperature" described in the method for determining the melting temperature in JIS K 7121:1987 "Testing Methods for Transition Temperatures of Plastics".

The weight average molecular weight (Mw) of the crystalline polyester resin is preferably 6,000 or more and 35,000 or less.

The crystalline polyester resin is produced by, for example, a known production method, like amorphous polyester.

The amount of the binder resin relative to the entire toner particles is preferably 40 mass % or more and 95 mass % or less, more preferably 50 mass % or more and 90 mass % or less, still more preferably 60 mass % or more and 85 mass % or less.

Colorant

Examples of the colorant include pigments, such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, malachite green oxalate; and dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorant may be used alone or in combination of two or more.

The colorant may be a surface-treated colorant as necessary and may be used in combination with a dispersant. Two or more colorants may be used in combination.

The amount of the colorant relative to the entire toner particles is preferably 1 mass % or more and 30 mass % or less, more preferably 3 mass % or more and 15 mass % or less.

Release Agent

Examples of the release agent include hydrocarbon waxes; natural waxes, such as carnauba wax, rice wax, and candelilla wax; synthetic or mineral and petroleum waxes, such as montan wax; and ester waxes, such as waxes of fatty acid esters and montanic acid esters. The release agent is not limited to these.

The melting temperature of the release agent is preferably 50° C. or higher and 110° C. or lower, more preferably 60° C. or higher and 100° C. or lower.

The melting temperature is determined from the DSC curve obtained by differential scanning calorimetry (DSC) in accordance with "melting peak temperature" described in the method for determining the melting temperature in JIS K 7121:1987 "Testing Methods for Transition Temperatures of Plastics".

The amount of the release agent relative to the entire toner particles is preferably 1 mass % or more and 20 mass % or less, more preferably 5 mass % or more and 15 mass % or less.

Other Additives

Examples of other additives include known additives, such as magnetic substances, charge controlling agents, and inorganic powders. These additives are internal additives contained in the toner particles.

Properties of Toner Particles and Like

The toner particles may be toner particles having a single-layer structure, or may be toner particles having so-called a core-shell structure including a core part (core particle) and a coating layer (shell layer) coating the core part.

The toner particles having a core-shell structure include, for example, a core part containing a binder resin and, as desired, other additives such as a colorant and a release agent; and a coating layer containing a binder resin.

The volume average particle size (D50v) of the toner particles is preferably 2 μm or more and 10 μm or less, more preferably 4 μm or more and 8 μm or less.

The volume average particle size (D50v) of the toner particles is measured by using Coulter Multisizer II (available from Beckman Coulter, Inc.) and electrolyte ISOTON-II (available from Beckman Coulter, Inc.).

Before measurement, 0.5 mg or more and 50 mg or less of a test sample is added to 2 ml of a 5 mass % aqueous solution of a surfactant (e.g., sodium alkylbenzene sulfonate) serving as a dispersant. The resulting mixture is added to 100 ml or more and 150 ml or less of the electrolyte.

The electrolyte in which the sample is suspended is subjected to a dispersion treatment using an ultrasonic disperser for 1 minute, and the particle size distribution of particles having a particle size in the range of 2 μm or more and 60 μm or less is measured by using Coulter Multisizer II with an aperture having a diameter of 100 μm. The number of sampled particles is 50,000. The volume-base particle size distribution is drawn from the smaller particle size, and the particle size at 50% cumulative volume is defined as a volume average particle size D50v.

The average circularity of the toner particles is preferably 0.94 or more and 1.00 or less, more preferably 0.95 or more and 0.98 or less.

The average circularity of the toner particles is obtained from (the circle equivalent circumference)/(the circumference)[(the circumference of a circle having the same projected area as the particle image)/(the circumference of the projected particle image)]. Specifically, the average circularity of the toner particles is a value determined by the following method.

First, the toner particles to be analyzed are collected by suction to form a flat flow, and particle images are captured with stroboscopic flash as still images. The particle images are analyzed with a flow particle image analyzer (FPIA-3000 available from Sysmex Corporation) to determine the average circularity. The number of samples used to determine the average circularity is 3,500.

When the toner has external additives, the toner (developer) to be analyzed is dispersed in surfactant-containing water and then subjected to ultrasonication to remove external additive and generate toner particles.

Method for Producing Toner Particles

The toner particles may be produced by using any one of dry production methods (e.g., a kneading-grinding method) and wet production methods (e.g., an aggregation-coalescence method, a suspension-polymerization method, and a dissolution-suspension method). The method is not limited to these production methods, and a known production method is employed. Of these methods, an aggregation-coalescence method may be used to produce the toner particles.

Specifically, for example, when the toner particles are produced by using an aggregation-coalescence method, the toner particles are produced through the following steps: a step (resin particle dispersion preparing step) of preparing a resin particle dispersion in which resin particles serving as a binder resin are dispersed; a step (aggregated particle forming step) of aggregating the resin particles (and other particles as desired) in the resin particle dispersion (in a dispersion after addition of other particle dispersion as desired) to form aggregated particles; and a step (fusion-coalescence step) of heating an aggregated particle dispersion in which the aggregated particles are dispersed, causing fusion and coalescence of the aggregated particles to form toner particles.

The details of each step will be described below.

The following description provides a method for producing toner particles containing a colorant and a release agent, but the colorant and the release agent are used as desired. Additives other than the colorant and the release agent may be used.

Resin Particle Dispersion Preparing Step

A resin particle dispersion in which resin particles serving as a binder resin are dispersed is prepared together with, for example, a colorant particle dispersion in which colorant particles are dispersed, and a release agent particle dispersion in which release agent particles are dispersed.

The resin particle dispersion is prepared by, for example, dispersing the resin particles in a dispersion medium by using a surfactant.

Examples of the dispersion medium used in the resin particle dispersion include aqueous media.

Examples of aqueous media include water, such as distilled water and ion exchange water, and alcohols. These aqueous media may be used alone or in combination of two or more.

Examples of the surfactant include anionic surfactants, such as sulfate ester salts, sulfonate salts, phosphate esters, and soaps; cationic surfactants, such as amine salts and quaternary ammonium salts; and nonionic surfactants, such as polyethylene glycols, alkylphenol ethylene oxide adducts, and polyhydric alcohols. Of these surfactants, in particular, anionic surfactants and cationic surfactants may be used. A nonionic surfactant may be used in combination with an anionic surfactant or a cationic surfactant.

The surfactant may be used alone or in combination of two or more.

Examples of a method for dispersing resin particles in a dispersion medium to prepare the resin particle dispersion include ordinary dispersion methods using, for example, a rotary shear homogenizer, a ball mill having media, a sand mill, and Dyno-Mill. Depending on the type of resin particles, the resin particles may be dispersed in the dispersion medium by a phase-inversion emulsification method. The phase-inversion emulsification method is a method for dispersing a resin in the form of particles in an aqueous medium. This method involves dissolving a target resin in a hydrophobic organic solvent capable of dissolving the resin; adding a base to the organic continuous phase (O phase) to cause neutralization; and then adding an aqueous medium (W phase) to cause phase inversion from W/O to O/W.

The volume average particle size of resin particles dispersed in the resin particle dispersion is preferably, for example, 0.01 μm or more and 1 μm or less, more preferably 0.08 μm or more and 0.8 μm or less, still more preferably 0.1 μm or more and 0.6 μm or less.

The volume average particle size of the resin particles is determined as follows: drawing the volume-based cumulative distribution from the smaller particle size as a function of divided particle size ranges (channels) of the particle size distribution measured with a laser diffraction particle size distribution analyzer (e.g., LA-700 available from Horiba Ltd.); and defining the particle size at 50% cumulative volume relative to all particles as a volume average particle size D50v. The volume average particle size of the particles in other dispersions is measured similarly.

The amount of the resin particles in the resin particle dispersion is preferably 5 mass % or more and 50 mass % or less, more preferably 10 mass % or more and 40 mass % or less.

Similarly to the resin particle dispersion, for example, the colorant particle dispersion and the release agent particle dispersion are also prepared. Specifically, the volume average particle size of the particles, the dispersion medium, the dispersion method, and the amount of the particles for the resin particle dispersion are the same as those for the colorant particles dispersed in the colorant particle dispersion and the release agent particles dispersed in the release agent particle dispersion.

Aggregated Particle Forming Step

Next, the resin particle dispersion is mixed with the colorant particle dispersion and the release agent particle dispersion.

The resin particles, the colorant particles, and the release agent particles cause hetero-aggregation in the dispersion mixture to form aggregated particles having a size close to the intended toner particle size and containing the resin particles, the colorant particles, and the release agent particles.

Specifically, the aggregated particles are formed, for example, as follows: adding an aggregating agent to the dispersion mixture and adjusting the pH of the dispersion mixture to the acid side (e.g., pH 2 or higher and pH 5 or lower), and adding a dispersion stabilizer as desired; and then heating the dispersion mixture to a temperature close to the glass transition temperature of the resin particles (specifically, for example, the glass transition temperature of the resin particles—30° C. or higher and the glass transition temperature—10° C. or lower) to cause aggregation of the particles dispersed in the dispersion mixture.

The aggregated particle forming step may involve, for example, adding an aggregating agent to the dispersion mixture at room temperature (e.g., 25° C.) under stirring with a rotary shear homogenizer and adjusting the pH of the dispersion mixture to the acid side (e.g., pH 2 or higher and pH 5 or lower), and heating the dispersion mixture after addition of a dispersion stabilizer as desired.

Examples of the aggregating agent include surfactants having polarity opposite to the polarity of the surfactant contained in the dispersion mixture, inorganic metal salts, and divalent or higher valent metal complexes. The use of a metal complex as an aggregating agent reduces the amount of the surfactant used and improves charging characteristics.

The aggregating agent may be used in combination with an additive that forms a complex or a similar bond with metal ions of the aggregating agent, as desired. The additive may be a chelator.

Examples of inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelator may be a water-soluble chelator. Examples of the chelator include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA).

The total amount of the chelator added relative to 100 parts by mass of the resin particles is preferably 0.01 parts by mass or more and 5.0 parts by mass or less, more preferably 0.1 parts by mass or more and less than 3.0 parts by mass.

Fusion-Coalescence Step

Next, the aggregated particle dispersion in which the aggregated particles are dispersed is heated to, for example, a temperature not lower than the glass transition temperature of the resin particles (e.g., a temperature higher than the glass transition temperature of the resin particles by 10° C. to 30° C.) to cause fusion and coalescence of the aggregated particles into toner particles.

The toner particles are produced through the above-described steps.

The toner particles may be produced through the following steps: a step of preparing an aggregated particle dispersion in which aggregated particles are dispersed, then mixing the aggregated particle dispersion and a resin particle dispersion in which resin particles are dispersed, and causing aggregation such that the resin particles adhere to the surfaces of the aggregated particles to form secondary aggregated particles; and a step of fusing and coalescing the secondary aggregated particles into toner particles having a core-shell structure by heating a secondary aggregated particle dispersion in which the secondary aggregated particles are dispersed.

After completion of the fusion-coalescence step, the toner particles formed in the dispersion are subjected to a known washing step, a known solid-liquid separation step, and a known drying step to provide dry toner particles. The washing step may involve sufficient displacement washing with ion exchange water in view of the charging characteristics. The solid-liquid separation step may involve, for example, suction filtration or pressure filtration in view of productivity. The drying step may involve, for example, freeze drying, flush drying, fluidized bed drying, or vibratory fluidized bed drying in view of productivity.

The toner according to the exemplary embodiment is produced by, for example, adding external additives to the obtained dry toner particles and mixing them. Mixing may be performed with, for example, a V-blender, a Henschel mixer, or a Lodige mixer. In addition, coarse particles in the toner may be removed with, for example, a vibratory sifter, a wind sifter, as desired.

External Additives

Examples of external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3.2SiO_2$, $CaCO_3$, $MgCO_3$, $BaSO_4$, and $MgSO_4$.

The surfaces of the inorganic particles serving as an external additive may be hydrophobized. Hydrophobization is performed by, for example, immersing the inorganic particles in a hydrophobizing agent. Examples of the hydrophobizing agent include, but are not limited to, a silane coupling agent, a silicone oil, a titanate coupling agent, and an aluminum coupling agent. These hydrophobizing agents may be used alone or in combination of two or more.

The amount of the hydrophobizing agent is normally, for example, 1 part by mass or more and 10 parts by mass or less relative to 100 parts by mass of the inorganic particles.

Examples of external additives also include resin particles (resin particles made of, for example, polystyrene, polymethyl methacrylate, and melamine resin), and cleaning active agents (e.g., higher fatty acid metal salts, such as zinc stearate, fluoropolymer particles).

The amount of external additives externally added is, for example, 0.01 mass % or more and 5 mass % or less, more preferably 0.01 mass % or more and 2.0 mass % or less relative to the toner particles.

Image Forming Apparatus, Image Forming Method

An image forming apparatus according to an exemplary embodiment includes: an image holding member; a charging unit that charges the surface of the image holding member; an electrostatic charge image forming unit that forms an electrostatic charge image on the charged surface of the image holding member; a developing unit that contains an electrostatic charge image developer and develops an electrostatic charge image on the surface of the image holding member by using the electrostatic charge image developer to form a toner image; a transfer unit that transfers the toner image on the surface of the image holding member to the surface of a recording medium; and a fixing unit that fixes the toner image that has been transferred to the surface of the recording medium. The electrostatic charge image developer contains the carrier for electrostatic charge image development produced by the method for producing a carrier for electrostatic charge image development according to the exemplary embodiment.

An image forming method (an image forming method according to an exemplary embodiment) is carried out in the image forming apparatus according to the exemplary embodiment. The image forming method includes: a charging step of charging the surface of the image holding member; an electrostatic charge image forming step of forming an electrostatic charge image on the charged surface of the image holding member; a developing step of developing the electrostatic charge image on the surface of the image holding member by using the electrostatic charge image developer according to the exemplary embodiment to form a toner image; a transferring step of transferring the toner image on the surface of the image holding member to the surface of a recording medium; and a fixing step of fixing the toner image that has been transferred to the surface of the recording medium.

The image forming method according to the exemplary embodiment uses the carrier for electrostatic charge image development produced by the method for producing a carrier for electrostatic charge image development according to the exemplary embodiment.

The image forming apparatus according to this exemplary embodiment may be a known image forming apparatus, such as a direct transfer-type apparatus in which a toner image formed on the surface of an image holding member is directly transferred to a recording medium; an intermediate transfer-type apparatus in which a toner image formed on the surface of an image holding member is firstly transferred to the surface of an intermediate transfer body, and the toner image, which has been transferred to the surface of the intermediate transfer medium, is secondarily transferred to the surface of a recording medium; an apparatus including a cleaning unit that cleans the surface of an image holding member before charging after transfer of a toner image; and an apparatus including a discharging unit that discharges the surface of an image holding member by irradiating the surface of the image holding member with discharging light before charging after transfer of a toner image.

In the case where the image forming apparatus according to this exemplary embodiment is an intermediate transfer-type apparatus, the transfer unit includes, for example, an intermediate transfer body having the surface to which a toner image is transferred, a first transfer unit that firstly transfers the toner image on the surface of the image holding member to the surface of the intermediate transfer body, and a second transfer unit that secondarily transfers the toner image, which has been transferred to the surface of the intermediate transfer body, to the surface of a recording medium.

In the image forming apparatus according to the exemplary embodiment, for example, a section including the developing unit may be a cartridge structure (process cartridge) that is attachable to and detachable from the image forming apparatus. The process cartridge may be, for example, a process cartridge that contains the electrostatic charge image developer according to the exemplary embodiment and that includes the developing unit.

An example of the image forming apparatus according to the exemplary embodiment will be described below, but the image forming apparatus is not limited to this example. The main parts shown in the figure will be described below, and the description of other parts is omitted.

FIG. 1 is a schematic structural view of the image forming apparatus according to the exemplary embodiment.

The image forming apparatus shown in FIG. 1 includes first to fourth electrophotographic image forming units 10Y, 10M, 10C, and 10K (image forming units), which respectively output yellow (Y), magenta (M), cyan (C), and black (K) color images based on color-separated image data. The image forming units (hereinafter may also be referred to simply as "units") 10Y, 10M, 10C, and 10K are arranged and spaced apart from each other at predetermined intervals in the horizontal direction. The units 10Y, 10M, 10C, and 10K may be process cartridges that are attachable to and detachable from the image forming apparatus.

An intermediate transfer belt (an example of the intermediate transfer body) 20 is located above and in upper parts of the units 10Y, 10M, 10C, and 10K. The intermediate transfer belt 20 extends so as to pass through the units 10Y, 10M, 10C, and 10K. The intermediate transfer belt 20 is wound around a drive roller 22 and a support roller 24 and runs in the direction from the first unit 10Y to the fourth unit 10K. The support roller 24 experiences a force in a direction away from the drive roller 22 by means of a spring or the like (not shown), so that tension is applied to the intermediate transfer belt 20 wound around the support roller 24 and the drive roller 22. An intermediate transfer body cleaning device 30 is disposed at a surface of the intermediate transfer belt 20 adjacent to the image holding member so as to face the drive roller 22.

Yellow toner, magenta toner, cyan toner, and black toner respectively contained in toner cartridges 8Y, 8M, 8C, and 8K are respectively supplied to developing devices (examples of developing units) 4Y, 4M, 4C, and 4K of units 10Y, 10M, 10C, and 10K.

Since the first to fourth units 10Y, 10M, 10C, and 10K have the same structure and the same operation, the first unit 10Y disposed upstream in the running direction of the intermediate transfer belt to form a yellow image will be described as a representative example.

The first unit 10Y has a photoreceptor 1Y, which functions as an image holding member. The photoreceptor 1Y is surrounded by, in sequence, a charging roller (an example of the charging unit) 2Y, which charges the surface of the photoreceptor 1Y to a predetermined potential, an exposure device (an example of the electrostatic charge image forming unit) 3, which exposes the charged surface to a laser beam 3Y based on a color-separated image signal to form an electrostatic charge image, a developing device (an example of the developing unit) 4Y, which supplies charged toner to the electrostatic charge image to develop the electrostatic charge image, a first transfer roller 5Y (an example of the first transfer unit), which transfers the developed toner image to the intermediate transfer belt 20, and a photoreceptor cleaning device (an example of the cleaning unit) 6Y, which removes toner remaining on the surface of the photoreceptor 1Y after the first transfer.

The first transfer roller 5Y is disposed on the inner side of the intermediate transfer belt 20 so as to face the photoreceptor 1Y. The first transfer rollers 5Y, 5M, 5C, and 5K in the units are connected to the respective bias power supplies (not shown) that apply a first transfer bias. The transfer bias applied by each bias power supply to the corresponding first transfer roller changes under the control of a controller (not shown).

The operation of the first unit 10Y in forming a yellow image will be described below.

Before operation, the charging roller 2Y charges the surface of the photoreceptor 1Y to a potential of −600 V to −800 V.

The photoreceptor 1Y includes a conductive substrate (e.g., a volume resistivity of $1\times10^{-6}$ Ωcm or less at 20° C.) and a photosensitive layer stacked on the substrate. The photosensitive layer normally has high resistance (comparable to the resistance of common resins) but, upon irradiation with a laser beam, changes its specific electrical resistance in a laser beam-irradiated region. For this, the charged surface of the photoreceptor 1Y is irradiated with the laser beam 3Y from the exposure device 3 in accordance with yellow image data sent from the controller (not shown).

Accordingly, an electrostatic charge image with a yellow image pattern is formed on the surface of the photoreceptor 1Y.

The electrostatic charge image is formed on the surface of the photoreceptor 1Y by charging. Specifically, the electrostatic charge image is so-called a negative latent image formed by application of the laser beam 3Y to reduce the specific electrical resistance of the irradiated portion of the photosensitive layer so that the charges on the surface of the photoreceptor 1Y discharge while the charges on the portion that is not irradiated with the laser beam 3Y remain.

The electrostatic charge image formed on the photoreceptor 1Y rotates to a predetermined developing position as the photoreceptor 1Y runs. At this developing position, the electrostatic charge image on the photoreceptor 1Y is developed and visualized by the developing device 4Y to form a toner image.

The developing device 4Y contains, for example, an electrostatic charge image developer containing at least a yellow toner and a carrier. The yellow toner is triboelectrically charged by stirring inside the developing device 4Y so as to have charges with the same polarity (negative polarity) as charges on the photoreceptor 1Y and held on a developer roller (an example of a developer holding member). As the surface of the photoreceptor 1Y passes through the developing device 4Y, the yellow toner electrostatically adheres to discharged latent image areas on the surface of the photoreceptor 1Y, whereby the latent image is developed by the yellow toner. The photoreceptor 1Y having the yellow toner image formed thereon subsequently runs at a predetermined rate, and the toner image developed on the photoreceptor 1Y is transported to a predetermined first transfer position.

Upon the yellow toner image on the photoreceptor 1Y reaching the first transfer position, a first transfer bias is applied to the first transfer roller 5Y so that an electrostatic force from the photoreceptor 1Y toward the first transfer roller 5Y acts on the toner image, transferring the toner image on the photoreceptor 1Y to the intermediate transfer belt 20. The transfer bias applied at this time has polarity (+) opposite to the polarity (−) of the toner. The transfer bias is controlled at, for example, +10 μA in the first unit 10Y by the controller (not shown).

The toner remaining on the photoreceptor 1Y is removed and collected by the photoreceptor cleaning device 6Y.

The first transfer biases applied to the first transfer rollers 5M, 5C, and 5K in the second unit 10M and the subsequent units are also controlled in accordance with the first unit 10Y.

Accordingly, the intermediate transfer belt 20 to which the yellow toner image has been transferred in the first unit 10Y is transported through the second to fourth units 10M, 10C, and 10K, and the toner images of respective colors are multiply transferred in a superimposed manner.

The intermediate transfer belt 20 to which the four color toner images have been multiply transferred through the first to fourth units reaches a second transfer section. The second transfer section includes the intermediate transfer belt 20, the support roller 24 in contact with the inner surface of the intermediate transfer belt, and a second transfer roller (an example of the second transfer unit) 26 disposed adjacent to the image holding surface of the intermediate transfer belt 20. A sheet of recording paper (an example of the recording medium) P is fed to a gap between the second transfer roller 26 and the intermediate transfer belt 20 through a feeding mechanism at a predetermined timing, and a second transfer bias is applied to the support roller 24. The transfer bias applied at this time has the same polarity (−) as the polarity (−) of the toner, and an electrostatic force from the intermediate transfer belt 20 toward the sheet of recording paper P acts on the toner image, transferring the toner image on the intermediate transfer belt 20 to the sheet of recording paper P. The second transfer bias in this case is determined on the basis of the resistance detected by a resistance detector (not shown) that detects the resistance of the second transfer section. The voltage of the second transfer bias is controlled.

The sheet of recording paper P is then conveyed to a pressure contact part (nip part) between a pair of fixing rollers in a fixing device (an example of the fixing unit) 28. The toner image is thus fixed to the sheet of recording paper P to form a fixed image.

Examples of the recording paper P to which a toner image is transferred include plain paper used in electrophotographic copiers, printers, and the like. Examples of the recording medium include OHP sheets, in addition to the recording paper P.

To further improve the smoothness of the image surface after fixing, the recording paper P may have a smooth surface and may be, for example, coated paper obtained by coating the surface of plain paper with resin or the like, art paper for printing, or the like.

The sheet of recording paper P to which the color image has been fixed is discharged to a discharge section, and a series of color image forming operations are completed.

Process Cartridge

A process cartridge according to an exemplary embodiment is a process cartridge attachable to and detachable from an image forming apparatus. The process cartridge includes a developing unit that contains the electrostatic charge image developer according to the exemplary embodiment and develops an electrostatic charge image on the surface of an image holding member by using the electrostatic charge image developer to form a toner image.

The process cartridge according to the exemplary embodiment is not limited to the foregoing structure and may include a developing unit and, as desired, at least one selected from, for example, an image holding member, a charging unit, an electrostatic charge image forming unit, a transfer unit, and other units.

An example of the process cartridge according to the exemplary embodiment will be described below, but the process cartridge is not limited to this example. The main parts shown in the figure will be described below, and the description of other parts is omitted.

Figure 2:
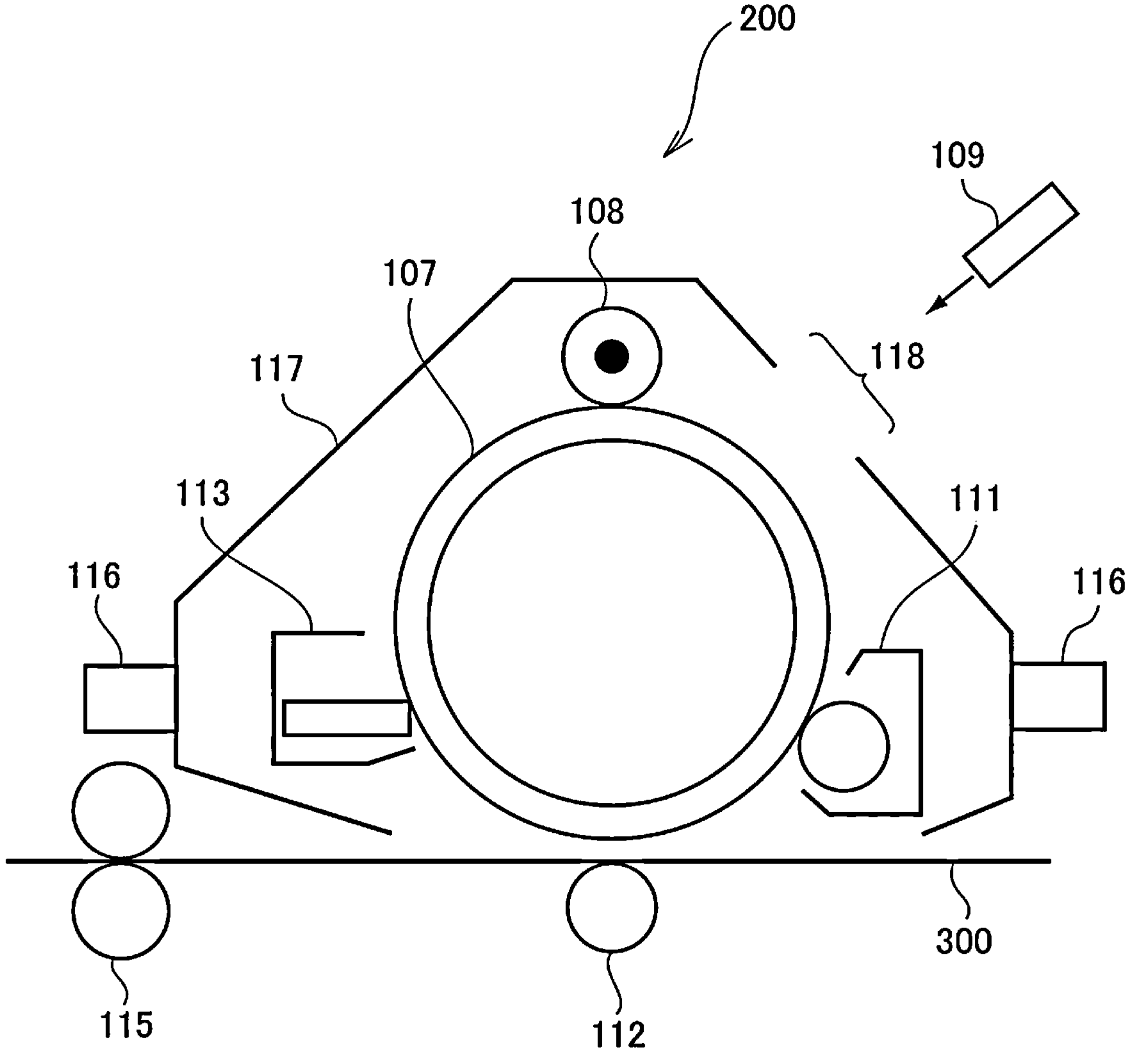
FIG. 2 is a schematic structural view of an example of a process cartridge attachable to and detachable from the image forming apparatus according to the exemplary embodiment.

FIG. 2 is a schematic view of an example of the process cartridge according to this exemplary embodiment.

A process cartridge 200 shown in FIG. 2 is configured as a cartridge in such a manner that, for example, a photoreceptor 107 (an example of the image holding member), a charging roller 108 (an example of the charging unit) on the periphery of the photoreceptor 107, a developing device 111 (an example of the developing unit), and a photoreceptor cleaning device 113 (an example of the cleaning unit) are integrally combined and held together by a housing 117 including an installation rail 116 and an opening 118 for exposure.

In FIG. 2, the reference numeral 109 represents an exposure device (an example of the electrostatic charge image forming unit), the reference numeral 112 represents a transfer device (an example of the transfer unit), the reference numeral 115 represents a fixing device (an example of the fixing unit), and the reference numeral 300 represents a sheet of recording paper (an example of the recording medium).

EXAMPLES

Exemplary embodiments of the present disclosure will be described below in detail by way of Examples, but exemplary embodiments of the present disclosure are not limited to these Examples. In the following description, the units "part" and "%" are on a mass basis, unless otherwise specified.

Preparation of Toner

Preparation of Colorant Particle Dispersion

Cyan pigment (copper phthalocyanine B 15:3 available from Dainichiseika Colour & Chemicals Mfg. Co., Ltd.): 50 parts by mass Anionic surfactant: 5 parts by mass of Neogen SC (available from DKS Co. Ltd.)

Ion exchange water: 200 parts by mass

These materials are mixed and dispersed with ULTRA-TURRAX available from IKA Ltd. for 5 minutes and in an ultrasonic bath for another 10 minutes to form a colorant particle dispersion with a solid content of 21%. The volume average particle size is 160 nm as being measured with a particle size analyzer LA-700 available from Horiba Ltd.

Preparation of Release Agent Particle Dispersion

Paraffin wax: HNP-9 (available from Nippon Seiro Co., Ltd.): 19 parts by mass

Anionic surfactant: Neogen SC (available from DKS Co. Ltd.): 1 part by mass

Ion exchange water: 80 parts by mass

These materials are mixed in a heat-resistant container, heated to 90° C., and stirred for 30 minutes. Next, the melt is circulated from the bottom of the container to a Gaulin homogenizer. The melt undergoes a circulation operation corresponding to three passes under a pressure of 5 MPa and then undergoes another circulation operation corresponding to three passes under a higher pressure of 35 MPa. The resulting emulsion is cooled to 40° C. or lower in the heat-resistant container to form a release agent particle dispersion. The volume average particle size is 240 nm as being measured with a particle size analyzer LA-700 available from Horiba Ltd.

Resin Particle Dispersion

Oil Layer

Styrene (available from FUJIFILM Wako Pure Chemical Corporation): 30 parts by mass n-Butyl acrylate (available from FUJIFILM Wako Pure Chemical Corporation): 10 parts by mass β-Carboxyethyl acrylate (available from Rhodia Nicca, Ltd.): 1.3 parts by mass Dodecanethiol (available from FUJIFILM Wako Pure Chemical Corporation): 0.4 parts by mass Water Layer 1

Ion exchange water: 17 parts by mass

Anionic surfactant (Dowfax available from The Dow Chemical Company): 0.4 parts by mass Water Layer 2

Ion exchange water: 40 parts by mass

Anionic surfactant (Dowfax available from The Dow Chemical Company): 0.05 parts by mass Ammonium peroxodisulfate (available from FUJIFILM Wako Pure Chemical Corporation): 0.4 parts by mass The components of the oil layer and the components of the water layer 1 are placed in a flask and mixed under stirring to form a monomer-emulsified dispersion. The components of the water layer 2 are placed in a reaction vessel, and the reaction vessel is sufficiently purged with nitrogen and heated under stirring in an oil bath until the reaction system reaches 75° C. The monomer-emulsified dispersion is gradually added dropwise to the reaction vessel over 3 hours to cause emulsion polymerization. After completion of dropwise addition, the polymerization further continues at 75° C., and the polymerization is terminated after 3 hours.

The volume average particle size D50v of the resulting resin particles is 250 nm as being measured with a laser diffraction particle size distribution analyzer LA-700 (available from HORIBA, Ltd). The glass transition temperature of the resin is 53° C. as being measured by using a differential scanning calorimeter (DSC-50 available from Shimadzu Corporation) at a heating rate of 10° C./min. The number average molecular weight (on a polystyrene basis) is 13,000 as being measured by using a molecular weight analyzer (HLC-8020 available from Tosoh Corporation) with THF as a solvent. A resin particle dispersion having a volume average particle size of 250 nm, a solid content of 42%, a glass transition temperature of 53° C., and a number average molecular weight Mn of 13,000 is produced accordingly.

Preparation of Toner 1

Resin particle dispersion: 150 parts by mass

Colorant particle dispersion: 30 parts by mass

Release agent particle dispersion: 40 parts by mass

Polyaluminum chloride: 0.4 parts by mass

These components are mixed well in a stainless steel flask by using ULTRA-TURRAX available from IKA Ltd. to form a dispersion. Under stirring in the flask, the dispersion is then heated to 48° C. in a heating oil bath. The dispersion is maintained at 48° C. for 80 minutes. To the dispersion, 70 parts by mass of the resin particle dispersion is then added gently.

Subsequently, the system is adjusted to pH 6.0 by using a 0.5 mol/L aqueous solution of sodium hydroxide. The stainless steel flask is then sealed, and the stirrer shaft is sealed with a magnetic seal. Under continuous stirring, the system is heated to 97° C. and held for 3 hours.

After completion of the reaction, the system is cooled at a cooling rate of 1° C./min and filtered, followed by washing well with ion exchange water and subsequent solid-liquid separation through Nutsche suction filtration. The obtained material is further dispersed again in 3,000 parts by mass of ion exchange water at 40° C., and stirred and washed at 300 rpm for 15 minutes. This washing process is repeated another 5 times. When the pH of the filtrate reaches 6.54 and the electrical conductivity of the filtrate reaches 6.5 μS/cm, the dispersion is subjected to solid-liquid separation through Nutsche suction filtration using No. 5A filter paper. Next, vacuum drying continues for 12 hours to provide toner particles.

As being measured with a Coulter counter, the volume average particle size D50v of the toner particles is 6.2 μm, and the volume average particle size distribution index GSDv is 1.20. As the shape of the particles is observed with a LUZEX Image Analyzer available from Luzex, the shape factor SF1 of the particles is 135, which indicates that the particles have a potato shape. The glass transition temperature of the toner is 52° C. To this toner is added silica ($SiO_2$) particles having an average primary particle size of 40 nm and having the surface hydrophobized with hexamethyldisilazane (hereinafter may be abbreviated as "HMDS") and metatitanic acid compound particles having an average primary particle size of 20 nm, which is a reaction product of metatitanic acid and isobutyltrimethoxysilane, in such a manner that the coverage on the surfaces of the toner particles is 40%. The mixture is mixed with a Henschel mixer to produce a toner 1.

Preparation of Coating Liquid 1

Lacquer (a mixed solution of 20 parts of polycyclohexyl methacrylate (weight average molecular weight: 65,000, glass transition temperature: 105° C.) and 80 parts of toluene: 100 parts)

Carbon black (average particle size: 0.2 μm): 0.2 parts

These materials are charged into a sand mill and dispersed for 30 minutes to provide a coating liquid 1.

Example 1

Ferrite core (volume average particle size: 35 μm): 100 parts

Coating liquid 1: the amount corresponding to 3.0 parts of resin solid content relative to 100 parts of the ferrite core These components are charged into a batch-type stirring vacuum mixer (50-L kneader available from Inoue MFG. Inc., the stirring blade diameter D=0.25 m, the clearance between the periphery of the blade and the inner wall of the casing/D=3.5%) with the jacket heated to 90° C., and preheated to 70° C. while being mixed under stirring at 60 rpm. Next, the solvent is dried with the inner pressure of the mixer reduced to 5 kPa-a. Cold water at 20° C. is poured into the jacket at the time when, after increasing with drying and decreasing after completion of drying, the stirring power of the mixer decreases to 1.3 times or less the stirring power before the start of drying. After 45 minutes from the time point at which the cold water is poured (=the time point at which, after the start of drying of the solvent, the load power of the stirring blade decreases to 1.3 times or less the load power of the stirring blade before drying), stirring is stopped, and the resulting particles are discharged from the mixer to a container to prepare a carrier 1.

Example 2

A carrier 2 is prepared in the same manner as in Example 1 except that cold water at 20° C. is poured into the jacket at the time when the stirring power of the mixer decreases to 1.3 times or less the stirring power before the start of drying and, after 30 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Example 3

A carrier 3 is prepared in the same manner as in Example 1 except that cold water at 20° C. is poured into the jacket at the time when the stirring power of the mixer decreases to 1.3 times or less the stirring power before the start of drying and, after 80 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Example 4

A carrier 4 is prepared in the same manner as in Example 1 except that, at the time when the stirring power of the mixer decreases to 1.3 times or less the stirring power before the start of drying, the number of revolutions is changed from 60 rpm to 20 rpm, and cold water at 20° C. is poured into the jacket and, after 65 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Example 5

A carrier 5 is prepared in the same manner as in Example 1 except that, at the time when the stirring power of the mixer decreases to 1.3 times or less the stirring power before the start of drying, the number of revolutions is changed from 60 rpm to 20 rpm, and cold water at 20° C. is poured into the jacket and, after 240 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Example 6

A carrier 6 is prepared in the same manner as in Example 1 except that, at the time when the stirring power of the mixer decreases to 1.3 times or less the stirring power before the start of drying, the number of revolutions is changed from 60 rpm to 80 rpm, and cold water at 20° C. is poured into the jacket and, after 30 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Example 7

A carrier 7 is prepared in the same manner as in Example 1 except that, at the time when the stirring power of the mixer decreases to 1.3 times or less the stirring power before the start of drying, the number of revolutions is changed from 60 rpm to 150 rpm, and cold water at 20° C. is poured into the jacket and, after 30 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Example 8

A carrier 8 is prepared in the same manner as in Example 1 except that, while the number of revolutions is kept at 60 rpm, cold water at 20° C. is poured into the jacket at the time when the stirring power of the mixer (50-L kneader, the stirring blade diameter D=0.25 m, the clearance between the periphery of the blade and the inner wall of the casing/D=5.0%) decreases to 1.3 times or less the stirring power before the start of drying and, after 45 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Example 9

A carrier 9 is prepared in the same manner as in Example 1 except that, while the number of revolutions is kept at 60 rpm, cold water at 20° C. is poured into the jacket at the time when the stirring power of the mixer (50-L kneader, the stirring blade diameter D=0.25 m, the clearance between the periphery of the blade and the inner wall of the casing/D=7.5%) decreases to 1.3 times or less the stirring power before the start of drying and, after 45 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Example 10

A carrier 10 is prepared by continuously charging the carrier 2, which is prepared in Example 2 and collected at a temperature of 90° C., into a fluidized bed cooling device Slit Flow (Okawara Mfg. Co., Ltd.), causing the carrier 2 to flow in the air at 20° C. at a superficial velocity of 20 mm/s (twice the minimum fluidization velocity) for 115 minutes to cool the carrier 2 to 70° C.

Example 11

A carrier 11 is prepared by continuously charging the carrier 2 into a fluidized bed cooling device Slit Flow in the same manner as in Example 10, and causing the carrier 2 to flow in the air at 20° C. at a superficial velocity of 50 mm/s (5 times the minimum fluidization velocity) for 100 minutes to cool the carrier 2 to 70° C.

Example 12

A carrier 12 is prepared by continuously charging the carrier 2 into a fluidized bed cooling device Slit Flow in the same manner as in Example 10, and causing the carrier 2 to flow in the air at 20° C. at a superficial velocity of 100 mm/s (10 times the minimum fluidization velocity) for 80 minutes to cool the carrier 2 to 70° C.

Example 13

A carrier 13 is prepared by continuously charging the carrier 2 into a fluidized bed cooling device Slit Flow in the same manner as in Example 10, and causing the carrier 2 to flow in the air at 20° C. at a superficial velocity of 150 mm/s (15 times the minimum fluidization velocity) for 60 minutes to cool the carrier 2 to 70° C.

Example 14

A carrier 14 is prepared by, while circulating water at 20° C. in a jacket of Paddle Dryer NPD-1.5W-1/2L (available from Nara Machinery Co., Ltd.), charging 50 kg of the carrier 2, which is prepared in Example 2 and collected at a temperature of 90° C., into Paddle Dryer and cooling the carrier 2 at 45 rpm for 50 minutes to 70° C.

Example 15

Ferrite core (volume average particle size: 35 μm): 100 parts

Coating liquid 1: the amount corresponding to 5.0 parts of resin solid content relative to 100 parts of the ferrite core A carrier 15 is prepared by the same method as that in Example 1 except that the components are changed as described above from those in Example 1.

Example 16

Preparation of Coating Liquid 2

Lacquer (a mixed solution of 20 parts of polycyclohexyl methacrylate (weight average molecular weight: 65,000, glass transition temperature: 105° C.) and 80 parts of toluene: 100 parts Carbon black (average particle size 0.2 μm): 0.4 parts These materials are charged into a sand mill and dispersed for 30 minutes to provide a coating liquid 2.

A carrier 16 is prepared by the same method as that in Example 1 except that the coating liquid 1 of Example 1 is changed to the coating liquid 2.

Example 17

Ferrite core (volume average particle size: 25 μm): 100 parts

Coating liquid 1: the amount corresponding to 3.0 parts of resin solid content relative to 100 parts of the ferrite core A carrier 17 is prepared by the same method as that in Example 1 except that the particle size of the ferrite core is changed to 25 μm.

Example 18

A carrier 18 is prepared by the same method as that in Example 1 except that the coating liquid 1 is changed to the coating liquid 2, and the particle size of the ferrite core is changed to 25 μm.

Comparative Example 1

A carrier 19 is prepared in the same manner as in Example 1 except that, at the time when the stirring power of the mixer decreases to 1.3 times or less the stirring power before the start of drying, the number of revolutions is changed from 60 rpm to 10 rpm, and cold water at 20° C. is poured into the jacket and, after 100 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Comparative Example 2

A carrier 20 is prepared in the same manner as in Example 1 except that, at the time when the stirring power of the mixer decreases to 1.3 times or less the stirring power before the start of drying, the number of revolutions is changed from 60 rpm to 10 rpm, and cold water at 20° C. is poured into the jacket and, after 300 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Comparative Example 3

A carrier 21 is prepared in the same manner as in Example 1 except that cold water at 20° C. is poured into the jacket at the time when the stirring power of the mixer decreases to 1.3 times or less the stirring power before the start of drying and, after 15 minutes from the time point at which the cold water is poured (=the time point at which, after the start of drying of the solvent, the load power of the stirring blade decreases to the load power of the stirring blade before drying), stirring at 60 rpm is stopped, and the resulting particles are discharged from the mixer to a container.

Comparative Example 4

A carrier 22 is prepared in the same manner as in Example 1 except that cold water at 20° C. is poured into the jacket at the time when the stirring power of the mixer decreases to 1.3 times or less the stirring power before the start of drying and, after 90 minutes from the time point at which the cold water is poured (=the time point at which, after the start of drying of the solvent, the load power of the stirring blade decreases to the load power of the stirring blade before drying), stirring at 60 rpm is stopped, and the resulting particles are discharged from the mixer to a container.

Comparative Example 5

A carrier 23 is prepared in the same manner as in Example 1 except that, at the time when the stirring power of the mixer decreases to 1.3 times or less the stirring power before the start of drying, the number of revolutions is changed from 60 rpm to 175 rpm, and cold water at 20° C. is poured into the jacket and, after 10 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Comparative Example 6

A carrier 24 is prepared in the same manner as in Example 1 except that, at the time when the stirring power of the mixer decreases to 1.3 times or less the stirring power before the start of drying, the number of revolutions is changed from 60 rpm to 175 rpm, and cold water at 20° C. is poured into the jacket and, after 30 minutes from the time point at which the cold water is poured (=the time point at which, after the start of drying of the solvent, the load power of the stirring blade decreases to the load power of the stirring blade before drying), stirring is stopped, and the resulting particles are discharged from the mixer to a container.

Preparation of Developer

One of the carriers 1 to 15 and the toner 1 are placed in a V-blender at a mixing ratio of carrier:toner=100:10 (mass ratio) and stirred for 20 minutes to form the corresponding one of developers 1 to 15.

Measurement of Coverage of Resin Coating Layer in Carrier

The coverage of the resin coating layer on the surface of the carrier is determined by X-ray photoelectron spectroscopy (XPS) as described below.

The target carrier and the magnetic particles obtained by removing the resin coating layer from the target carrier are prepared. Examples of the method for removing the resin coating layer from the carrier include a method for removing the resin coating layer by dissolving a resin component in toluene. The carrier and the magnetic particles without the resin coating layer are used as test samples and subjected to XPS to quantitatively analyze Fe, C, and O (atomic %). (Fe of the carrier)/(Fe of the magnetic particles)×100 is calculated to obtain the percentage (%) of the exposed magnetic particles. (100−the percentage of the exposed magnetic particles) is defined as the coverage (%) of the resin coating layer.

Measurement of Free Resin Amount in Carrier

A certain amount of the carrier is measured and dispersed in water, and the dispersion is filtered with the carrier fixed with magnet. The filter paper is dried, and the free resin amount is calculated from a difference in mass before and after filtration and the measured carrier amount.

Measurement of Proportion of Aggregates in Carrier After 75 μm Sifting

The carrier is sifted through a sieve with a mesh size of 75 μm, and the sifted carrier particles are spread so as to overlap each other as little as possible. Photographs of the sifted carrier particles are taken with a scanning electron microscope (SEM) at a magnification of 350 times, and the percentage of the number of carrier particles that are not crushed to primary particles relative to the number of carrier particles in one field of view is measured.

Evaluation of Color Dullness

The color dullness is evaluated as described below.

By using 700 Digital Color Press (available from Fuji Xerox Co., Ltd.) charged with the prepared developer, a solid image patch 5 cm×5 cm is output on a sheet of paper (Sample 1) and, after an image with an area coverage of 5% is output on 100,000 sheets of paper, the solid image patch 5 cm×5 cm is output again on a sheet of paper (Sample 2). The color space (L*, a*, b*) of Sample 1 and Sample 2 is measured. The color space is measured with an image densitometer X-RITE 938 (available from X-RITE, Incorporated).

ΔE is calculated by using the following formula from a difference between the color space of Sample 2 and the color space of Sample 1 and used as an indicator for evaluating color dullness.

$$\Delta E=[(\Delta L^*)^2+(\Delta a^*)^2+(\Delta b^*)^2]^{1/2}$$

where ΔL*=(L* of Sample 2−L* of Sample 1), Δa*=(a* of Sample 2−of Sample 1), and Δb*=(b* of Sample 2−b* of Sample 1).

The evaluation criteria are as described below.

Evaluation Criteria

G1: ΔE≤3.0

G2: 3.0<ΔE≤6.0

G3: 6.0<ΔE≤10

G4: 10<ΔE

The evaluation results are summarized in Table 1 and Table 2.

TABLE 1

| | Carrier | | | Crushing/Cooling Conditions | | | | | |
|---|---|---|---|---|---|---|---|---|---|
| Type | Volume Average Particle Size (μm) of Core Particles | Coating Resin Amount (mass %) Relative to Core Particles | Amount of Carbon Black (mass %) Added Relative to Core Particles | Device Clearance (%) | Number of Revolutions n (rpm) | Crushing Time T (min) | Peripheral Speed (m/s) | Stirring Workload (m) | Collecting Temperature (° C.) |
| Example 1 | 1 | 35 | 3 | 0.2 | 3.5 | 60 | 45 | 0.79 | 2,121 | 83 |
| Example 2 | 2 | 35 | 3 | 0.2 | 3.5 | 60 | 30 | 0.79 | 1,414 | 90 |

TABLE 1-continued

| | | | | | | | | | | |
|---|---|---|---|---|---|---|---|---|---|---|
| Example 3 | 3 | 35 | 3 | 0.2 | 3.5 | 60 | 80 | 0.79 | 3,770 | 65 |
| Example 4 | 4 | 35 | 3 | 0.2 | 3.5 | 20 | 65 | 0.26 | 1,021 | 70 |
| Example 5 | 5 | 35 | 3 | 0.2 | 3.5 | 20 | 240 | 0.26 | 3,770 | 65 |
| Example 6 | 6 | 35 | 3 | 0.2 | 3.5 | 80 | 30 | 1.05 | 1,885 | 85 |
| Example 7 | 7 | 35 | 3 | 0.2 | 3.5 | 150 | 30 | 1.96 | 3,534 | 80 |
| Example 8 | 8 | 35 | 3 | 0.2 | 5.0 | 60 | 45 | 0.79 | 2,121 | 75 |
| Example 9 | 9 | 35 | 3 | 0.2 | 7.5 | 60 | 45 | 0.79 | 2,121 | 75 |
| Example 10 | 10 | 35 | 3 | 0.2 | 3.5 | 60 | 30 | 0.79 | 1,414 | 90 |
| Example 11 | 11 | 35 | 3 | 0.2 | 3.5 | 60 | 30 | 0.79 | 1,414 | 90 |
| Example 12 | 12 | 35 | 3 | 0.2 | 3.5 | 60 | 30 | 0.79 | 1,414 | 90 |
| Example 13 | 13 | 35 | 3 | 0.2 | 3.5 | 60 | 30 | 0.79 | 1,414 | 90 |
| Example 14 | 14 | 35 | 3 | 0.2 | 3.5 | 60 | 30 | 0.79 | 1,414 | 90 |
| Example 15 | 15 | 35 | 5 | 0.2 | 3.5 | 60 | 45 | 0.79 | 2,121 | 78 |
| Example 16 | 16 | 35 | 3 | 0.4 | 3.5 | 60 | 45 | 0.79 | 2,121 | 77 |
| Example 17 | 17 | 25 | 3 | 0.2 | 3.5 | 60 | 45 | 0.79 | 2,121 | 78 |
| Example 18 | 18 | 25 | 2.5 | 0.4 | 3.5 | 60 | 45 | 0.79 | 2,121 | 83 |

| | Cooling Device | | | | Carrier Characteristics | | | |
|---|---|---|---|---|---|---|---|---|
| | | | | | Coating Resin | | | |
| | Type of Device | Cooling Conditions | Cooling Time (min) | Attainment Temperature (° C.) | Amount (mass %) Relative to 100 Parts of Carrier | Coverage (%) | Free Resin Amount (ppm) | Evaluation Suppression of Color Dullness |
| Example 1 | none | — | — | — | 2.96 | 93 | 49 | G1 |
| Example 2 | none | — | — | — | 2.95 | 91 | 46 | G1 |
| Example 3 | none | — | — | — | 2.98 | 94 | 58 | G1 |
| Example 4 | none | — | — | — | 2.99 | 93 | 48 | G1 |
| Example 5 | none | — | — | — | 2.97 | 92 | 65 | G1 |
| Example 6 | none | — | — | — | 2.98 | 93 | 45 | G1 |
| Example 7 | none | — | — | — | 2.81 | 88 | 89 | G1 |
| Example 8 | none | — | — | — | 2.96 | 93 | 69 | G1 |
| Example 9 | none | — | — | — | 2.96 | 93 | 179 | G2 |
| Example 10 | fluidized bed | twice superficial velocity Umf | 115 | 70 | 2.98 | 93 | 43 | G1 |
| Example 11 | fluidized bed | 5 times superficial velocity Umf | 100 | 70 | 2.98 | 93 | 42 | G1 |
| Example 12 | fluidized bed | 10 times superficial velocity Umf | 80 | 70 | 2.98 | 93 | 65 | G1 |
| Example 13 | fluidized bed | 15 times superficial velocity Umf | 60 | 70 | 2.98 | 93 | 195 | G2 |
| Example 14 | paddle cooler | 45 rpm | 50 | 70 | 2.98 | 93 | 175 | G2 |
| Example 15 | none | — | — | — | 4.98 | 94 | 48 | G1 |
| Example 16 | none | — | — | — | 2.99 | 97 | 178 | G2 |
| Example 17 | none | — | — | — | 2.98 | 94 | 42 | G1 |
| Example 18 | none | — | — | — | 2.45 | 82 | 94 | G2 |

TABLE 2

| | Carrier | | | | Crushing/Cooling Conditions | | | | | |
|---|---|---|---|---|---|---|---|---|---|---|
| | Type | Volume Average Particle Size (μm) of Core Particles | Coating Resin Amount (mass %) Relative to Core Particles | Amount of Carbon Black (mass %) Added Relative to Core Particles | Device Clearance (%) | Number of Revolutions n (rpm) | Crushing Time T (min) | Peripheral Speed (m/s) | Stirring Workload (m) | Collecting Temperature (° C.) |
| Comparative Example 1 | 19 | 35 | 3 | 0.2 | 3.5 | 10 | 100 | 0.13 | 785 | 65 |

TABLE 2-continued

| | | | | | | | | | | |
|---|---|---|---|---|---|---|---|---|---|---|
| Comparative Example 2 | 20 | 35 | 3 | 0.2 | 3.5 | 10 | 300 | 0.13 | 2,356 | 60 |
| Comparative Example 3 | 21 | 35 | 3 | 0.2 | 3.5 | 60 | 15 | 0.79 | 707 | 88 |
| Comparative Example 4 | 22 | 35 | 3 | 0.2 | 3.5 | 60 | 90 | 0.79 | 4,241 | 63 |
| Comparative Example 5 | 23 | 35 | 3 | 0.2 | 3.5 | 175 | 10 | 2.29 | 1,374 | 95 |
| Comparative Example 6 | 24 | 35 | 3 | 0.2 | 3.5 | 175 | 30 | 2.29 | 4,123 | 82 |

| | Cooling Device | | | | Carrier Characteristics | | | |
|---|---|---|---|---|---|---|---|---|
| | | | | | Coating Resin | | | |
| | Type of Device | Cooling Conditions | Cooling Time (min) | Attainment Temperature (° C.) | Amount (mass %) Relative to 100 Parts of Carrier | Coverage (%) | Free Resin Amount (ppm) | Evaluation Suppression of Color Dullness |
| Comparative Example 1 | none | — | — | — | 2.94 | 92 | 215 | G3 |
| Comparative Example 2 | none | — | — | — | 2.98 | 91 | 335 | G4 |
| Comparative Example 3 | none | — | — | — | 2.97 | 92 | 302 | G4 |
| Comparative Example 4 | none | — | — | — | 2.98 | 83 | 469 | G4 |
| Comparative Example 5 | none | — | — | — | 2.70 | 77 | 312 | G3 |
| Comparative Example 6 | none | — | — | — | 2.71 | 75 | 856 | G4 |

The above results indicate that the carriers of Examples reduce color dullness of the obtained image more than those of Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a carrier for electrostatic charge image development, the method comprising:

coating magnetic particles by adding the magnetic particles and a coating liquid containing a resin and a solvent to a mixer with a stirring blade to form a resin coating layer on surfaces of the magnetic particles and taking a carrier having the resin coating layer out of the mixer; and after the step of coating the magnetic particles, cooling the carrier to Tg−20° C. or lower in a fluidized bed device, where Tg is a glass transition temperature of the resin contained in the resin coating layer, wherein, in the step of coating the magnetic particles, stirring conditions after the solvent is evaporated and dried by heating in the mixer until the carrier is taken out of the mixer satisfy Formula 1 below and Formula 2 below:

0.2<peripheral speed mDn (m/s) of stirring blade<2.0 (Formula 1), $1\times10^3$<stirring workload (peripheral speed×stirring time T)<$4\times10^3$ (Formula 2), where D represents a diameter (m) of the stirring blade, n represents a number of revolutions (rps) of the stirring blade, and T represents a time (s) from a time point at which, after a load power of the stirring blade before drying of the solvent increases with drying until completion of drying, a load power of the stirring blade decreases to 1.3 times or less the load power of the stirring blade before drying to a time point at which stirring in the mixer is stopped.

2. The method for producing a carrier for electrostatic charge image development according to claim 1, wherein a superficial velocity v (m/s) of fluidizing gas during cooling in the cooling is 2 times or more and 10 times or less a minimum fluidization velocity Umf.

3. The method for producing a carrier for electrostatic charge image development according to claim 1, wherein the mixer is a batch-type vacuum mixer, and a clearance between a periphery of the stirring blade and a casing inner wall satisfies a condition of Formula 3 below:

Clearance/stirring blade diameter<5% (Formula 3).

4. The method for producing a carrier for electrostatic charge image development according to claim 2, wherein the mixer is a batch-type vacuum mixer, and a clearance between a periphery of the stirring blade and a casing inner wall satisfies a condition of Formula 3 below:

Clearance/stirring blade diameter<5% (Formula 3).

5. The method for producing a carrier for electrostatic charge image development according to claim 1, wherein a free resin amount contained in the produced carrier for electrostatic charge image development is 200 ppm or less.

6. The method for producing a carrier for electrostatic charge image development according to claim 3, wherein a free resin amount contained in the produced carrier for electrostatic charge image development is 200 ppm or less.

7. The method for producing a carrier for electrostatic charge image development according to claim 4, wherein a free resin amount contained in the produced carrier for electrostatic charge image development is 200 ppm or less.

8. The method for producing a carrier for electrostatic charge image development according to claim 6, wherein a free resin amount contained in the produced carrier for electrostatic charge image development is 200 ppm or less.

9. The method for producing a carrier for electrostatic charge image development according to claim 7, wherein the free resin amount contained in the produced carrier for electrostatic charge image development is 100 ppm or less.

10. The method for producing a carrier for electrostatic charge image development according to claim 9, wherein the free resin amount contained in the produced carrier for electrostatic charge image development is 100 ppm or less.

11. The method for producing a carrier for electrostatic charge image development according to claim 10, wherein the free resin amount contained in the produced carrier for electrostatic charge image development is 100 ppm or less.

12. A method for producing an electrostatic charge image developer, the method comprising the method for producing a carrier for electrostatic charge image development according to claim 1.

13. An image forming method using a carrier for electrostatic charge image development produced by the method for producing a carrier for electrostatic charge image development according to claim 1.

14. A carrier for electrostatic charge image development produced by the method for producing a carrier for electrostatic charge image development according to claim 1.

* * * * *